(12) United States Patent
Tooher et al.

(10) Patent No.: US 10,051,654 B2
(45) Date of Patent: Aug. 14, 2018

(54) UPLINK SPECTRUM EFFICIENCY

(71) Applicant: INTERDIGITAL PATENT HOLDINGS, INC., Wilmington, DE (US)

(72) Inventors: J. Patrick Tooher, Montreal (CA); Paul Marinier, Brossard (CA); Marian Rudolf, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 151 days.

(21) Appl. No.: 14/760,407

(22) PCT Filed: Jan. 16, 2014

(86) PCT No.: PCT/US2014/011811
§ 371 (c)(1),
(2) Date: Jul. 10, 2015

(87) PCT Pub. No.: WO2014/113546
PCT Pub. Date: Jul. 24, 2014

(65) Prior Publication Data
US 2016/0192385 A1 Jun. 30, 2016

Related U.S. Application Data

(60) Provisional application No. 61/863,324, filed on Aug. 7, 2013, provisional application No. 61/821,168, filed
(Continued)

(51) Int. Cl.
*H04W 72/04* (2009.01)
*H04W 72/12* (2009.01)
(Continued)

(52) U.S. Cl.
CPC ....... *H04W 72/1268* (2013.01); *H04L 5/0048* (2013.01); *H04L 5/0051* (2013.01);
(Continued)

(58) Field of Classification Search
CPC ............ H04W 72/1268; H04L 5/0048; H04L 5/0051; H04L 27/2602; H04L 1/00
See application file for complete search history.

(56) References Cited

U.S. PATENT DOCUMENTS 8,917,614 B2 * 12/2014 Luo ........................ H04B 7/024
370/252
2011/0013615 A1 1/2011 Lee et al.
(Continued)

FOREIGN PATENT DOCUMENTS

WO WO 2011/019960 A2 2/2011
WO WO 2011/053836 A2 5/2011
WO WO 2011/093670 A2 8/2011

OTHER PUBLICATIONS

3rd Generation Partnership Project (3GPP), TS 36.211 V10.1.0, "Technical Specification Group Radio Access Network, Evolved Universal Terrestrial Radio Access (E-UTRA), Physical Channels and Modulation (Release 10)", Mar. 2011, pp. 1-103.
(Continued)

*Primary Examiner* — Wei Zhao
(74) *Attorney, Agent, or Firm* — Condo Roccia Koptiw LLP

(57) ABSTRACT

Methods and systems are disclosed for reducing control signaling in uplink transmissions. A device, such as a wireless transmit/receive unit, may determine to use a demodulation reference signal (DM-RS) transmission schedule out of a plurality of DM-RS transmission schedules. The DM-RS transmission schedule may be characterized by a DM-RS transmission being mapped to a single orthogonal frequency-division multiplexing (OFDM) symbol per subframe of a data stream. The DM-RS transmission schedule may be characterized by a DM-RS transmission being mapped to a first subset of subcarriers of an OFDM symbol of a subframe of a data stream and Physical Uplink
(Continued)

Shared Channel (PUSCH) transmission or Physical Uplink Control Channel (PUCCH) control information being mapped to a second set of subcarriers of the OFDM symbol. The first set of subcarriers may be different than the second set of subcarriers. The data stream may be transmitted according to the DM-RS transmission schedule.

16 Claims, 12 Drawing Sheets

Related U.S. Application Data on May 8, 2013, provisional application No. 61/753,147, filed on Jan. 16, 2013.

(51) Int. Cl.
    *H04L 5/00* (2006.01)
    *H04L 27/26* (2006.01)
(52) U.S. Cl.
    CPC ...... *H04L 27/2602* (2013.01); *H04L 27/2611* (2013.01); *H04W 72/0446* (2013.01)

(56) References Cited

U.S. PATENT DOCUMENTS

| | | | |
|---|---|---|---|
| 2012/0188988 A1* | 7/2012 | Chung | H04J 13/00 370/335 |
| 2013/0194940 A1* | 8/2013 | Li | H04J 11/0023 370/252 |
| 2014/0185530 A1* | 7/2014 | Kuchibhotla | H04W 76/023 370/329 |
| 2014/0307693 A1* | 10/2014 | Feng | H04L 27/2602 370/329 |

OTHER PUBLICATIONS

3rd Generation Partnership Project (3GPP), TS 36.212 V10.1.0, "Technical Specification Group Radio Access Network, Evolved Universal Terrestrial Radio Access (E-UTRA), Multiplexing and Channel Coding (Release 10)", Mar. 2011, pp. 1-76.

3rd Generation Partnership Project (3GPP), TS 36.213 V10.1.0, "Technical Specification Group Radio Access Network, Evolved Universal Terrestrial Radio Access (E-UTRA), Physical Layer Procedures (Release 10)", Mar. 2011, pp. 1-115.

* cited by examiner

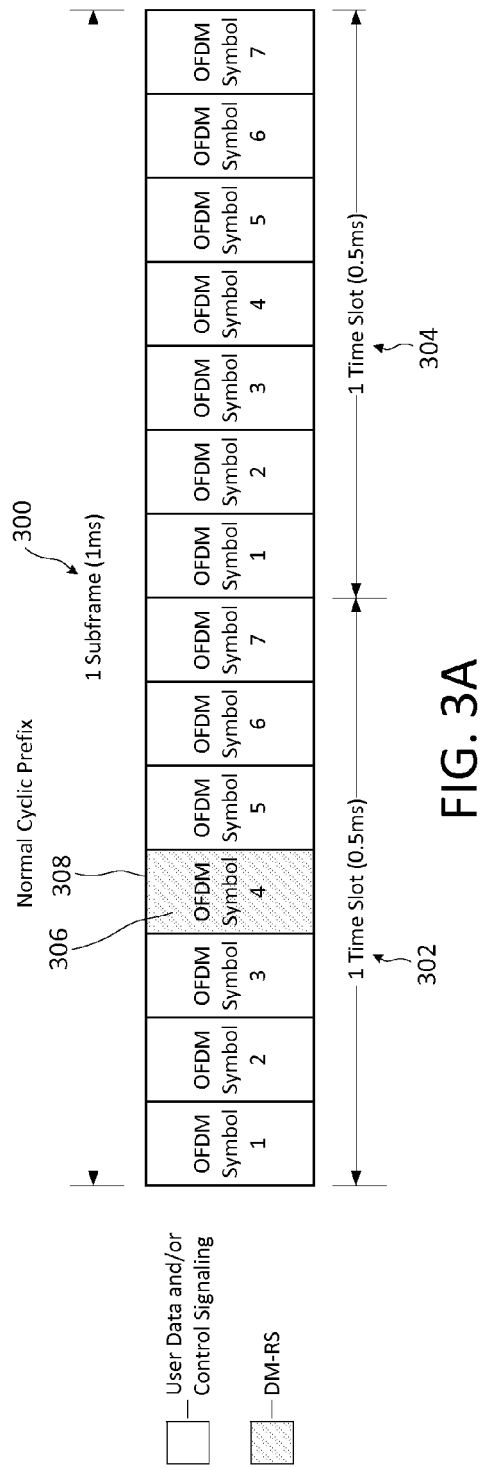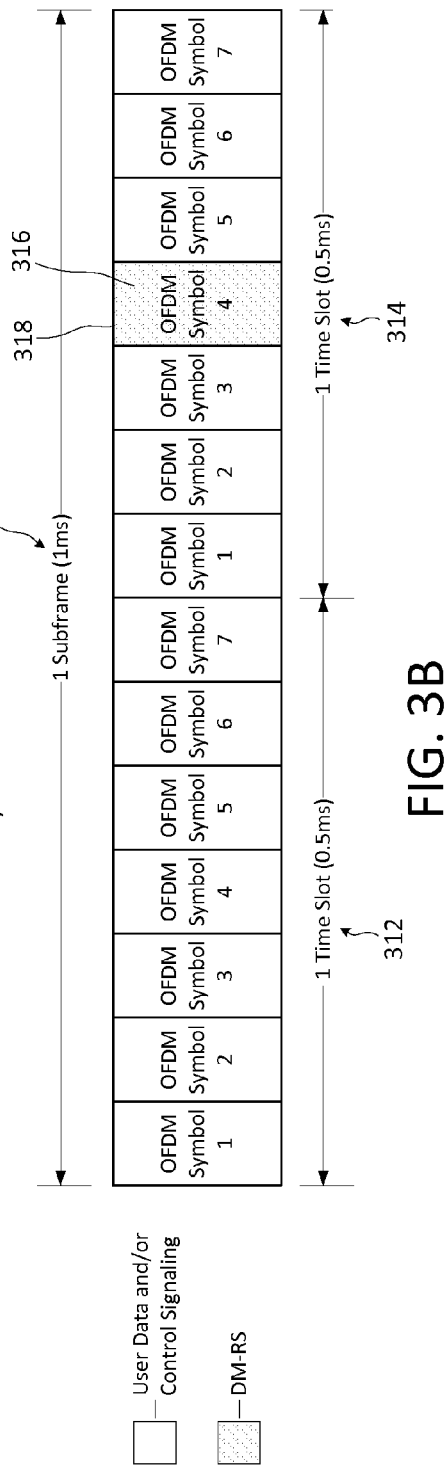
FIG. 3A
FIG. 3B

UPLINK SPECTRUM EFFICIENCY

This application is the National Stage entry under 35 U.S.C. §371 of Patent Cooperation Treaty Application PCT/US2014/011811, filed Jan. 16, 2014, which claims the benefit of U.S. Provisional Patent Application No. 61/863,324, filed Aug. 7, 2013, U.S. Provisional Patent Application No. 61/821,168, filed May 8, 2013, U.S. Provisional Patent Application No. 61/753,147, filed Jan. 16, 2013, the entire contents of which being hereby incorporated by reference as if fully set forth herein, for all purposes.

BACKGROUND

A demodulation reference symbol (DM-RS) may be provided for channel estimation for coherent demodulation. DM-RSs may be associated with physical uplink shared channel (PUSCH) data and/or physical uplink control channel (PUSCCH) control transmission. DM-RSs may be present in every transmitted uplink time slot.

FIG. 2A is a diagram of a prior art mapping of DM-RS transmission in a subframe with a normal cyclic prefix. FIG. 2B is a diagram of a prior art mapping of DM-RS transmission in a subframe with an extended cyclic prefix. FIG. 2C is a diagram of a prior art mapping of DM-RS transmission amongst subcarriers in a subframe with a normal cyclic prefix. A DM-RS may be mapped to an orthogonal frequency-division multiplexing (OFDM) symbol of each time slot. As shown in FIG. 2A, for normal cyclic prefix, the DM-RS may be mapped to the fourth OFDM symbol of each time slot. As shown in FIG. 2B, for extended cyclic prefix, the DM-RS may be mapped to the third OFDM symbol of each time slot. As shown in FIG. 2C, the DM-RS may be mapped to every subcarrier of an OFDM symbol for which it is mapped.

SUMMARY

Methods and systems are disclosed for reducing control signaling, for example, in uplink transmissions. For example, in order to limit the control signaling transmitted by a wireless transit/receive unit (WTRU), a DM-RS transmission schedule may be defined such that fewer DM-RSs are transmitted as compared to previous LTE releases. In an example, the location and/or coding of the DM-RS transmissions may be different than that of previous LTE releases in order to reduce signaling overhead. Methods and systems are disclosed for dynamically switching between uplink DM-RS transmission schedule and for performing retransmission with dynamic uplink DM-RS transmission schedule switching.

A WTRU may include a processor. The processor may be configured to determine to use a demodulation reference signal (DM-RS) transmission schedule. For example, the processor may determine to use a DM-RS transmission schedule out of a plurality of DM-RS transmission schedules. The DM-RS transmission schedule may be characterized by a DM-RS transmission being mapped to a single orthogonal frequency-division multiplexing (OFDM) symbol of a subframe of a data stream. As such, the DM-RS transmission may be mapped to a single time slot of the subframe. A DM-RS transmission may refer to one or more DM-RSs.

The OFDM symbol may be associated with a first time slot of the subframe and the DM-RS transmission schedule may be characterized by Physical Uplink Shared Channel (PUSCH) transmission and/or Physical Uplink Control Channel (PUCCH) control information being mapped to a corresponding OFDM symbol of a second time slot of the subframe of the data stream. The OFDM symbol may be associated with a second time slot of the subframe and the DM-RS transmission schedule may be characterized by PUSCH transmission and/or PUCCH control information being mapped to a corresponding OFDM symbol of a first time slot of the subframe of the data stream. A corresponding OFDM symbol of a time slot may refer to an OFDM symbol of another time slot that has the same relative time or position (e.g., the nth OFDM symbol of the time slots would be corresponding OFDM symbols).

The OFDM symbol may be a last OFDM symbol (e.g., the OFDM symbol in position six or seven depending of the cyclic prefix (CP)) of a first time slot of the subframe. The OFDM symbol may be a first OFDM symbol (e.g., the OFDM symbol in position one) of a second time slot of the subframe.

The DM-RS transmission schedule may be characterized by the DM-RS transmission being mapped to an OFDM symbol of a first time slot of a first subframe of the data stream and DM-RS transmission being mapped to an OFDM symbol of a second time slot of a second subframe of the data stream. The OFDM symbol of the first subframe may be in the same temporal position or a different temporal position as the OFDM symbol of the second subframe. The temporal position of an OFDM symbol may refer to the relative time location (e.g., nth OFDM symbol) of the OFDM symbol within a time slot.

The DM-RS transmission schedule may be characterized by a DM-RS transmission being mapped to a first subset of subcarriers of an OFDM symbol of a subframe of a data stream and PUSCH transmission and/or PUCCH control information being mapped to a second set of subcarriers of the OFDM symbol. The first set of subcarriers may be different than the second set of subcarriers. The first subset of the subcarriers of the OFDM symbol may be half of the subcarriers of the OFDM symbol. The first subset of subcarriers of the OFDM symbol may be the first six subcarriers of a physical resource block of the OFDM symbol. The first subset of subcarrier of the OFDM symbol may be the last six subcarriers of a physical resource block of the OFDM symbol. The first subset of the subcarriers of the OFDM symbol may be an integer multiple of twelve. The first subset of subcarriers may be even numbered subcarriers and the second subset of subcarriers may be odd numbered subcarriers. The first subset of subcarriers may be odd numbered subcarriers and the second subset of subcarriers may be even numbered subcarriers.

The processor may be configured to transmit the data stream according to the DM-RS transmission schedule. The data stream may include PUSCH transmission and/or PUCCH control information. The processor may determine to use the DM-RS transmission schedule based on whether the WTRU is connected to a small cell and/or based on whether the WTRU is connected to a macro cell. The plurality of DM-RS transmission schedules may include one or more legacy DM-RS transmission schedules.

BRIEF DESCRIPTION OF THE DRAWINGS

FIG. 3A is a diagram of an example mapping of DM-RS transmission in a first time slot of a subframe with a normal cyclic prefix.

FIG. 3B is a diagram of an example mapping of DM-RS transmission in a second time slot of a subframe with a normal cyclic prefix.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
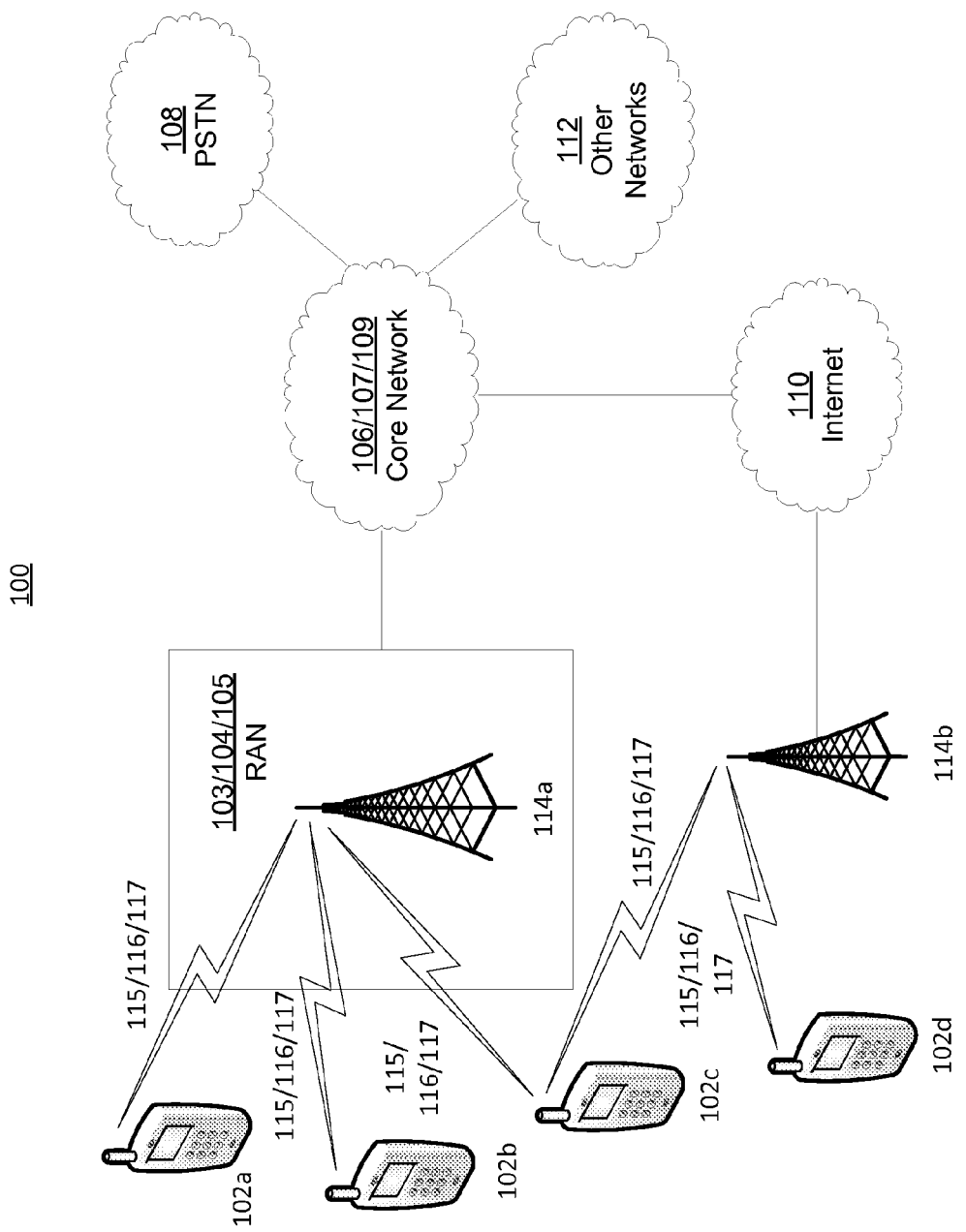
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
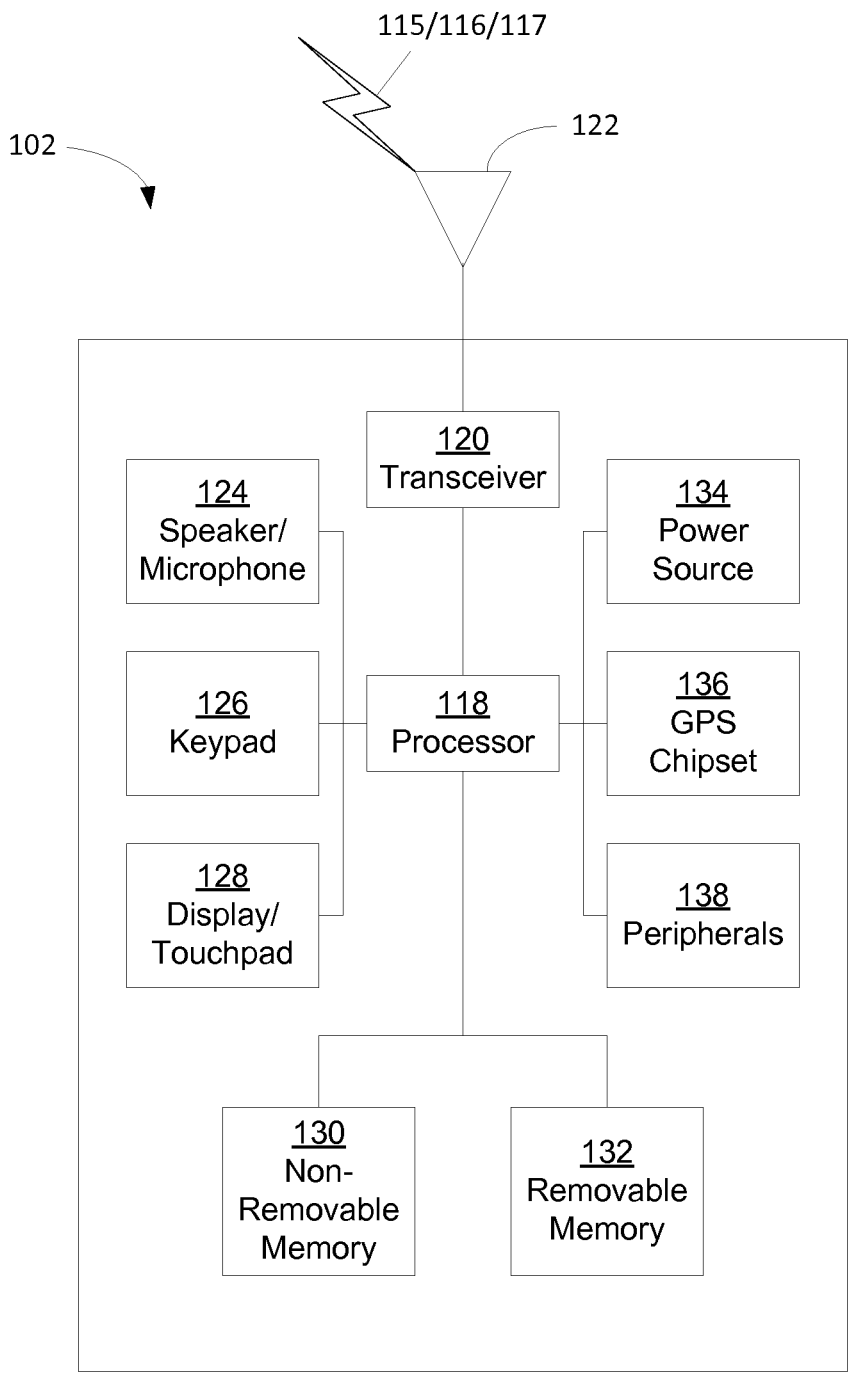
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
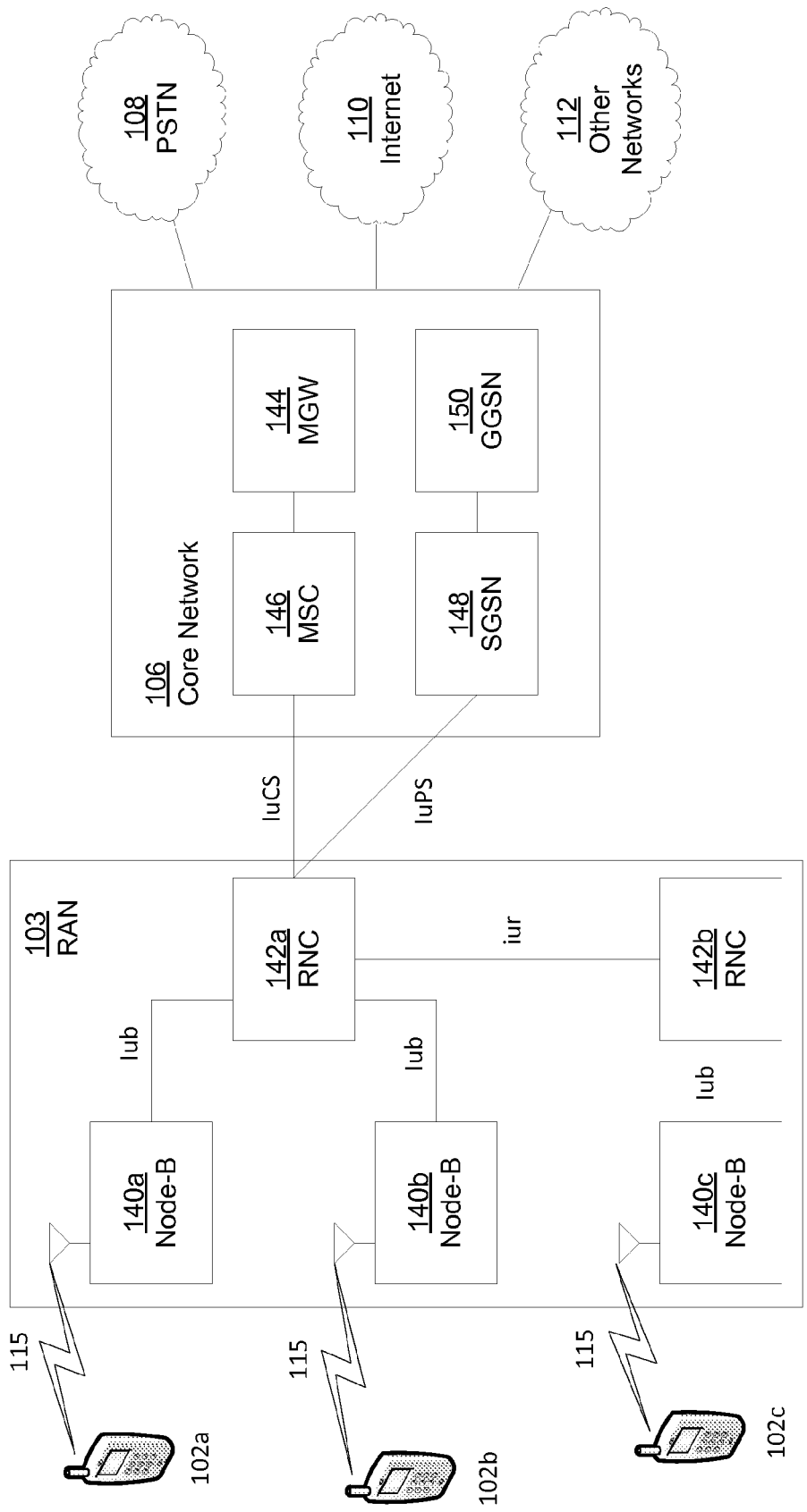
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
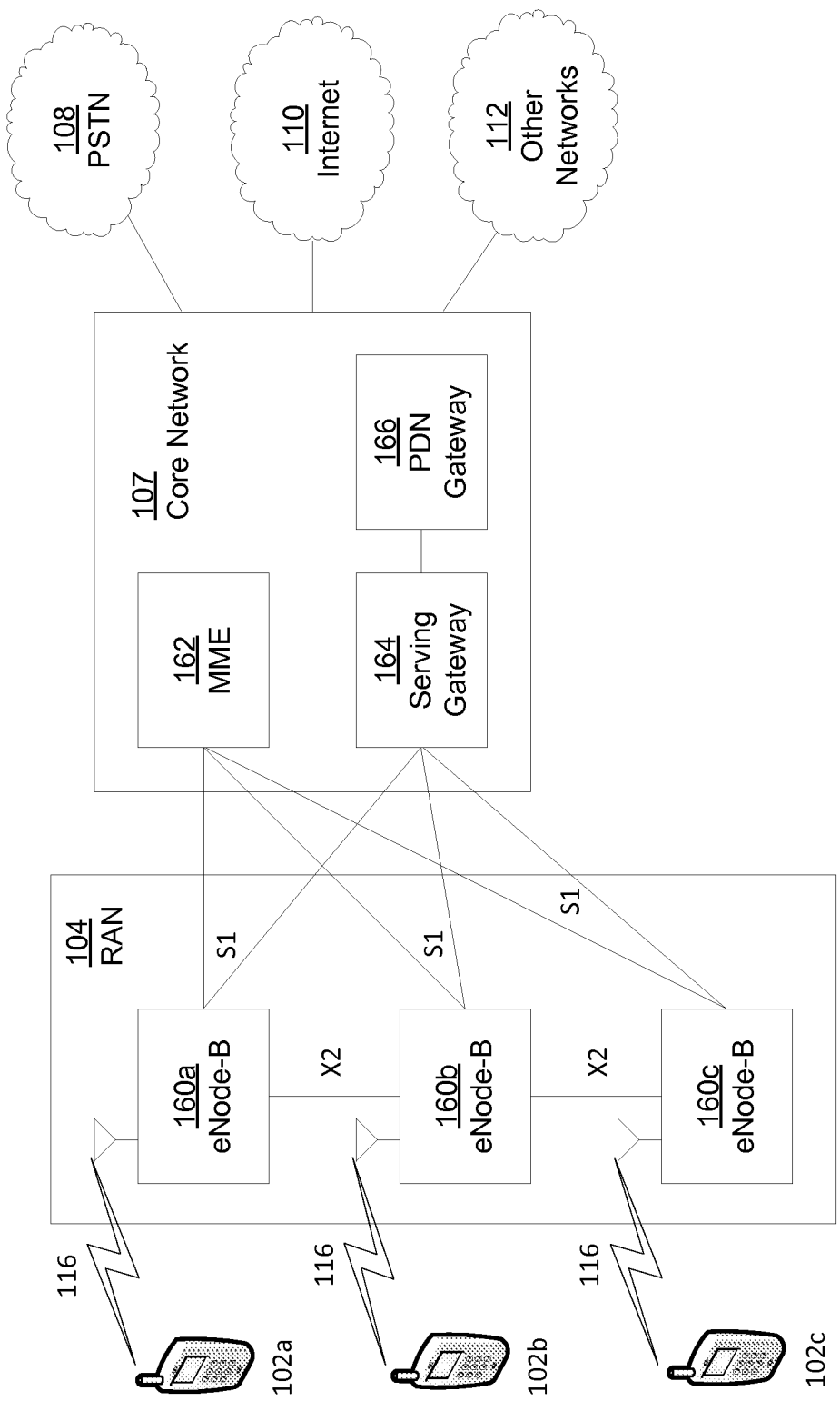
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
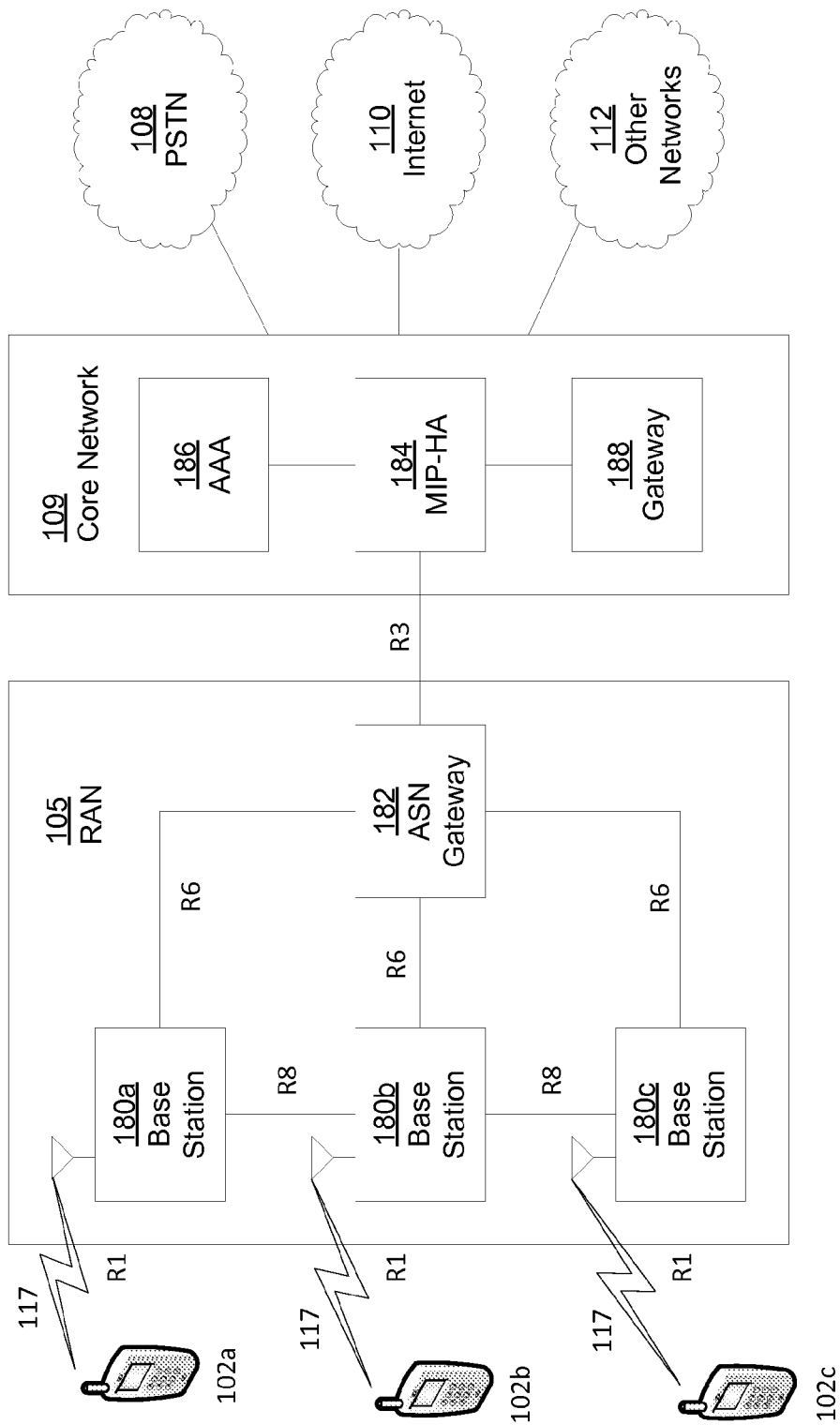
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

In order to increase system capacity and provide service to an increasing number of devices (e.g., such as a wireless transmit/receive unit (WTRU)), a deployment that includes a layer of small cells in addition to macro cells may be considered. For example, a layer of small cells may be configured to operate either in a separate frequency band and/or in the same frequency band than the one used by the macro cell layer. The use of such deployments may result in additional capacity being provided via the use of additional spectrum, via cell reuse, and/or due to spectrum efficiency gains that may be achieved due to the channel characteristics of the small cell environment. For example, the distribution of path loss between the small cell and a connected device may be such that large values of signal-to-noise-ratio are achieved more frequently.

The current Long Term Evolution (LTE) specifications are targeted to support a wide range of deployments in terms of cell sizes, environments, and device speeds. As a result, the LTE Release 8 and/or Release 10 physical layer may have been designed and configured in such a way as to meet diverse deployment scenarios. Therefore, the LTE physical layer may not be currently configured in a manner capable of taking full advantage of specific channel characteristics of a small cell environment. For example, uplink coverage may be enhanced via a variety of physical layer techniques that may be designed to operate specifically in the small cell environment.

Examples of small cells may include low-powered radio access nodes (e.g., NBs and/or eNBs) that operate in licensed and unlicensed spectrum, for example, that may have a range of 10 meters to 200 meters (e.g., compared to a mobile macrocell which might have a range of a few kilometers). To support the growth in mobile data traffic, the network may use the small cells to perform data offloading, which may result in a more efficient use of radio spectrum. Such use of small cells for data offloading may facilitate the management of LTE Advanced spectrum more efficiently compared to using just macrocells.

Small cells may include one or more of femtocells, picocells, and/or microcells. Small-cell networks may also be realized using distributed radio technology, for example centralized baseband units and remote radio heads. Beamforming techniques (e.g., focusing a radio signal/energy on a very specific area) may be utilized to further enhance or focus small cell coverage. A common factor in many approaches utilized to deploy small cells may be central management of the small cells by mobile network operators.

Small cells may be deployed on a wide range of air interfaces, for example including GSM, CDMA2000, Time Division Synchronous Code Division Multiple Access (TD-SCDMA), WCDMA, LTE, WiMax, and/or the like. In third generation partnership project (3GPP) terminology, a Home Node B (HNB) may be configured to serve a femtocell and/or some other type of small cell. A Home eNode B (HeNB) may be configured to serve an LTE femtocell and/or or some other type of small cell. A Wi-Fi network may be an example of a small cell that does not operate in licensed spectrum. As a result, it may be more difficult to manage Wi-Fi deployments effectively as compared to small cells that utilize licensed spectrum under the control of a network operator.

A form of small cells is femtocells. Femtocells were initially designed for residential and small business use, with a short range and a limited number of channels. Femtocells with increased range and capacity spawned a proliferation of terms including metrocells, metro femtocells, public access femtocells, enterprise femtocells, super femtos, Class 3 femto, greater femtos, and microcells. The term "small cells" may be used as an umbrella term to describe deployments that utilize one of more of these types of lower power and/or limited range cells.

In order to achieve the potential system throughput gains that may be provided via an efficient small cell deployment, the access system may be designed in such a way as to limit the amount of resources that are consumed by overhead. For example, a source of potential overhead may include resources used up by physical signals that do not include user data. An example of physical layer resources that may not carry user information are demodulation reference signals (DM-RSs). Therefore, one or more of the following techniques may be used to modify DM-RS transmission, for example, for small cell deployments to facilitate efficient small cell spectrum use. The methods and systems described herein may be used in any combination.

Although examples to reduce physical layer overhead in order to improve resource utilization may be described with reference to small cell environments, the examples and techniques described herein may be equally applicable to deployment in macro cell environments. Therefore, although certain benefits may be achieved by using the methods and systems described herein in a small cell deployment, embodiments contemplate the utilization of these techniques in macro deployments, and thus this disclosure should not be read to limit the techniques to small cell deployments alone.

As an example, a WTRU may be able to reduce overhead by altering the transmission schedule for DM-RSs and/or by reducing the overall transmission of DM-RSs within the system. For example, the DM-RS overhead may be reduced by decreasing the number of resource elements (REs) used to transmit DM-RSs. The reduction of DM-RS transmission may be performed in the time domain and/or in the frequency domain. For example, DM-RS transmission may be limited in the time domain by limiting the number of times a given frequency resource may be used for DM-RS transmission per subframe and/or per transmission time interval (TTI). For example, the WTRU may be configured to use a subcarrier such that the subcarrier has a single DM-RS symbol per subframe. In an example, DM-RS overhead reduction may be achieve in the frequency domain, for example by utilizing an OFDM symbol for a combination of PUSCH transmission and DM-RS transmission. Furthermore, hybrid combinations of time and/or frequency DM-RS transmission limitations may be utilized in order to reduce DM-RS transmission overhead.

A DM-RS transmission may refer to one or more DM-RSs. For example, a DM-RS transmission may be characterized by one or more DM-RSs that may be distributed across one or more REs, one or more PRBs, one or more time slots, one or more OFDM symbols, and/or one or more subframes of a data stream. A WTRU may be configured to select between one or more different DM-RS transmission schedules. A DM-RS transmission schedule may be characterized by one or more of the examples described herein. A DM-RS transmission configuration may refer to one or more DM-RS transmission schedules that may be used in one or more different subframes.

In an example, a DM-RS transmission may be characterized by a DM-RS being transmitted in a single OFDM symbol within a subframe instead of two OFDM symbols per subframe. If a DM-RS is transmitted in a single OFDM symbol per subframe, then the DM-RS would be transmitted in a single time slot of the two time slots of a subframe. As such, the DM-RS may be mapped to a single OFDM symbol of a subframe of a data stream.

Figure 2A:
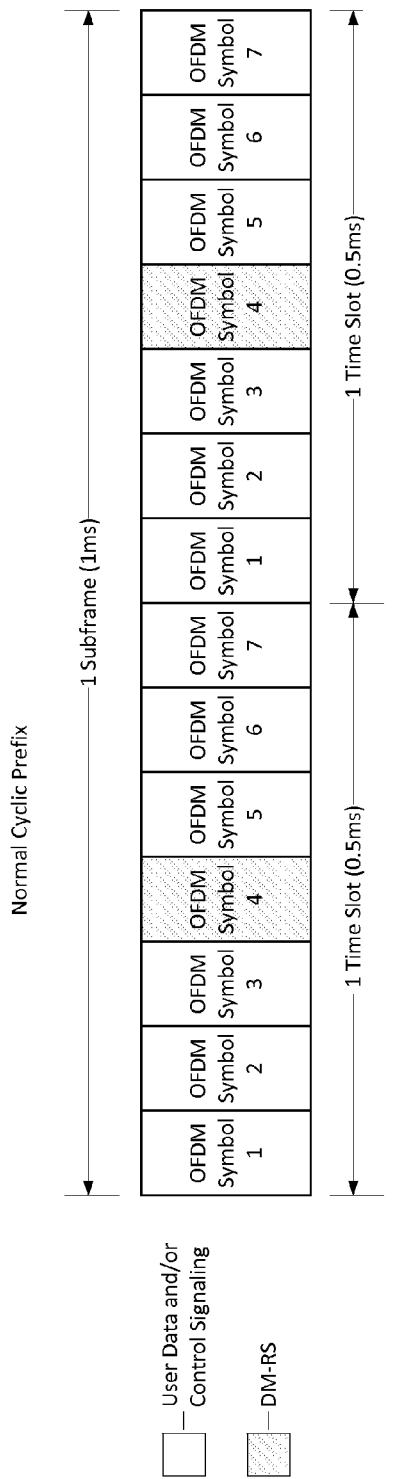
FIG. 2A is a diagram of a prior art mapping of demodulation reference symbols (DM-RS) transmission in a subframe with a normal cyclic prefix.
Figure 2B:
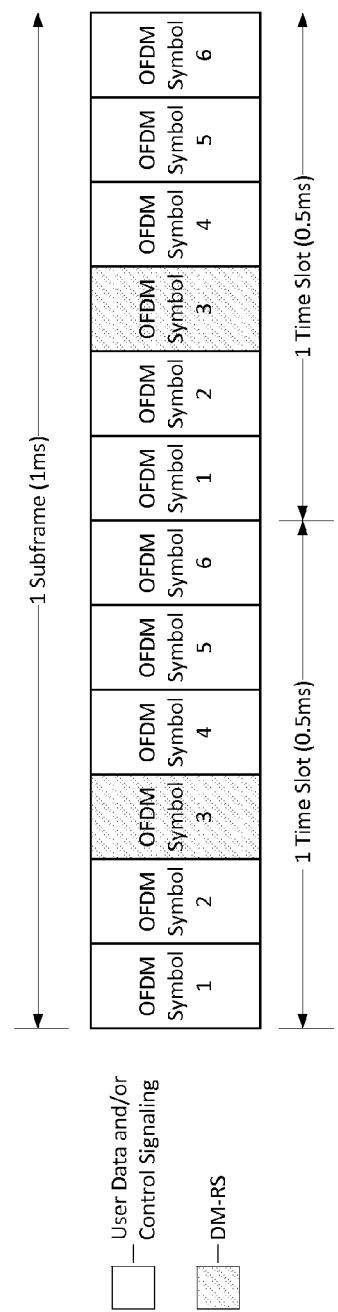
FIG. 2B is a diagram of a prior art mapping of DM-RS transmission in a subframe with an extended cyclic prefix.
Figure 2C:
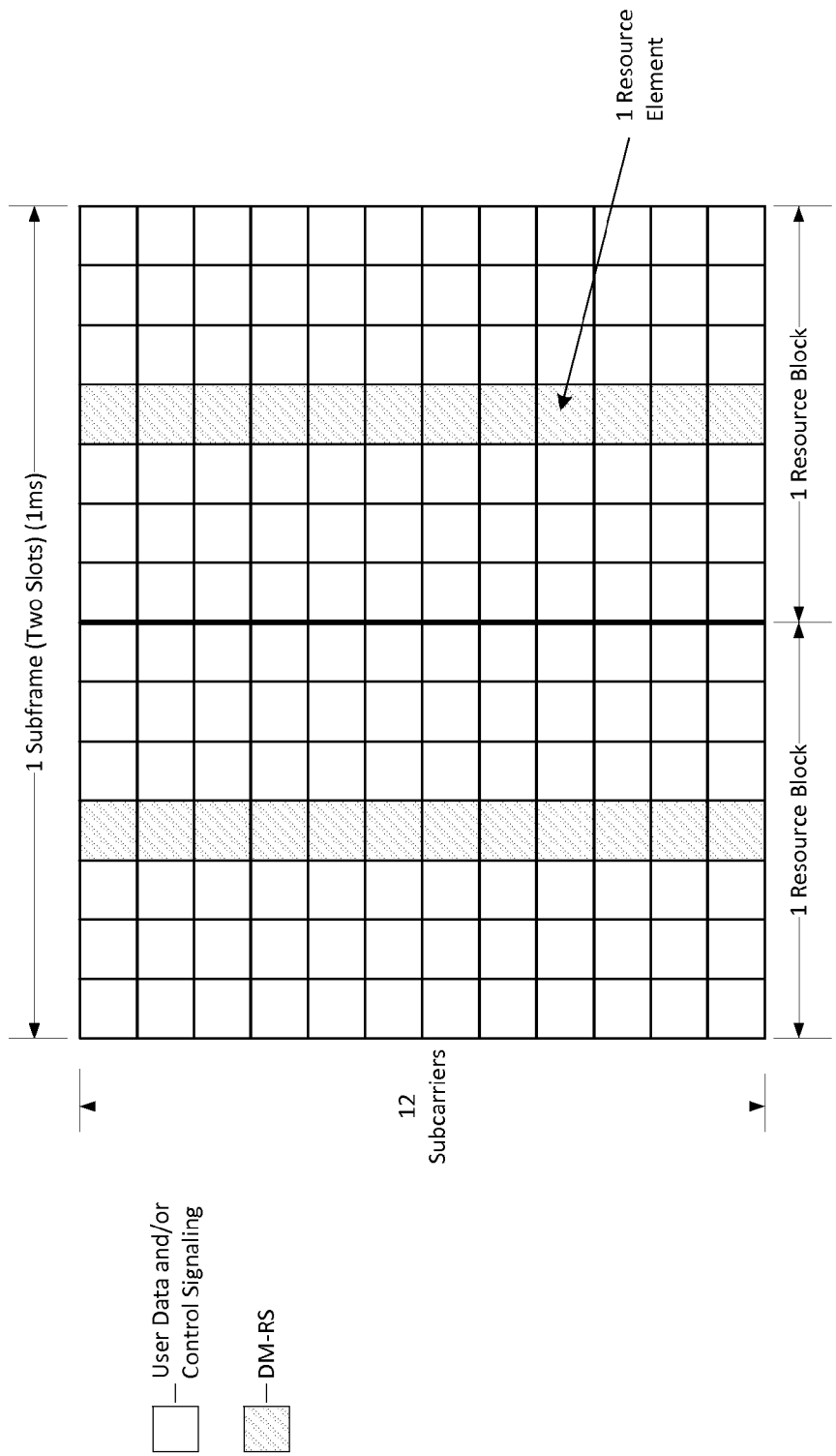
FIG. 2C is a diagram of a prior art mapping of DM-RS transmission amongst subcarriers in a subframe with a normal cyclic prefix.

If fewer OFDM symbols are used for DM-RS transmission, then one or more REs that were previously used for DM-RS transmission (e.g., according to Release 8/10) may instead be used for user data transmission and/or control signaling (e.g., via the PUSCH and/or the PUCCH). For example, in Release 8/10, the fourth symbol in the time slot (e.g., third symbol for extended cyclic prefix) may be used to transmit a DM-RS (e.g., as shown in FIG. 2A). In an example, the fourth symbol in the time slot (e.g., third symbol for extended cyclic prefix) may be used for transmission of a DM-RS in one of the time slots of a subframe, but not for the other time slot of the subframe. Instead, the symbol that was previously used for DM-RS transmission may be used for PUSCH transmission and/or for some other UL channel.

FIG. 3A is a diagram of an example mapping of a DM-RS transmission in a first time slot of a subframe with a normal cyclic prefix. As shown in FIG. 3A, a subframe 300 may include two time slots, a first time slot 302 and a second time slot 304. A DM-RS transmission 306 may be included in an OFDM symbol, such as the fourth OFDM symbol 308, of the first time slot 302 of the subframe 300. The DM-RS transmission 306 may be absent from the second time slot 304 of the subframe 300. For example, the fourth OFDM symbol of the second time slot 304 may include user data and/or control signaling as opposed to a DM-RS. Although illustrated as being included in the fourth OFDM symbol 308 of the first time slot 302, the DM-RS transmission 306 may be included in any OFDM symbol of the first time slot 302.

FIG. 3B is a diagram of an example mapping of DM-RS transmission in a second time slot of a subframe with a normal cyclic prefix. As shown in FIG. 3B, a subframe 310 may include two time slots, a first time slot 312 and a second time slot 314. A DM-RS transmission 316 may be included in an OFDM symbol, such as the fourth OFDM symbol 318, of the second time slot 314 of the subframe 310. The DM-RS transmission 316 may be absent from the first time slot 312 of the subframe 310. For example, the fourth OFDM symbol of the first time slot 312 may include user data and/or control signaling. Although illustrated as being included in the fourth OFDM symbol 318 of the second time slot 314, the DM-RS transmission 316 may be included in any OFDM symbol of the second time slot 314.

A WTRU may be configured to determine to use a DM-RS transmission schedule, for example, out of a plurality of DM-RS transmission schedules. The DM-RS transmission schedule may be characterized by a DM-RS transmission being mapped to a single OFDM symbol of a subframe of a data stream. As such, the DM-RS transmission may be mapped to a single time slot of the subframe. The OFDM symbol may be associated with a first time slot of the subframe and the DM-RS transmission schedule may be characterized by Physical Uplink Shared Channel (PUSCH) transmission and/or Physical Uplink Control Channel (PUCCH) control information being mapped to a corresponding OFDM symbol of a second time slot of the subframe of the data stream (e.g., as shown in FIG. 3A). The OFDM symbol may be associated with a second time slot of the subframe and the DM-RS transmission schedule may be characterized by PUSCH transmission and/or PUCCH control information being mapped to a corresponding OFDM symbol of a first time slot of the subframe of the data stream (e.g., as shown in FIG. 3B). A corresponding OFDM symbol of a time slot may refer to an OFDM symbol of another time slot that has the same relative time or position (e.g., the nth OFDM symbol of the time slots would be corresponding OFDM symbols).

The identity of a time slot that includes a DM-RS transmission may be varied across a plurality of subframes, for example, if a single slot per subframe includes an OFDM symbol with the DM-RS transmission. The identity of a time slot may refer to the number or temporal position of the time slot within a subframe (e.g., first time slot or second time slot). For example, there may be a group(s) of subframes where the first time slot includes a DM-RS transmission and another, possibly overlapping, group(s) of subframes where the second time slot includes DM-RS transmission. For example, a data stream may be characterized by an OFDM transmission schedule whereby a DM-RS transmission is incorporated into a single OFDM symbol of a first time slot of one or more subframes (e.g., as shown in FIG. 3A) and is incorporated into a single OFDM symbol of a second time slot of one or more subframes (e.g., as shown in FIG. 3B). The subframe(s) of the data stream may alternate between subframe(s) that incorporate the DM-RS transmission in the first time slot and subframe(s) that incorporate the DM-RS transmission in the second time slot. The subframe(s) that incorporate the DM-RS transmission in the first time slot may be equal to, greater than, or less than the subframe(s) that incorporate the DM-RS transmission in the second time slot.

In an example, a WTRU may determine the identity of a time slot that includes (and/or does not include) a DM-RS transmission based on the physical resource block(s) (PRB(s)) associated with an allocation. Therefore, the time slot used for DM-RS transmission may vary based on the PRB. For example, there may be a set of PRBs within a subframe where the first time slot includes a DM-RS transmission in an appropriate symbol of the first time slot. There may be a second set of PRBs, possibly overlapping the first set of PRBs, where the second time slot includes a DM-RS transmission in an appropriate symbol of the second time slot.

In an example, the OFDM symbol used for DM-RS transmission may be shifted towards the edge of a time slot. For example, if DM-RS is to be transmitted solely in the first time slot, the last symbol of the first time slot may be used for DM-RS transmission. On the other hand, if the DM-RS is to be transmitted solely in the second time slot, the first symbol of the second time slot may be used for DM-RS transmission.

Figure 4:
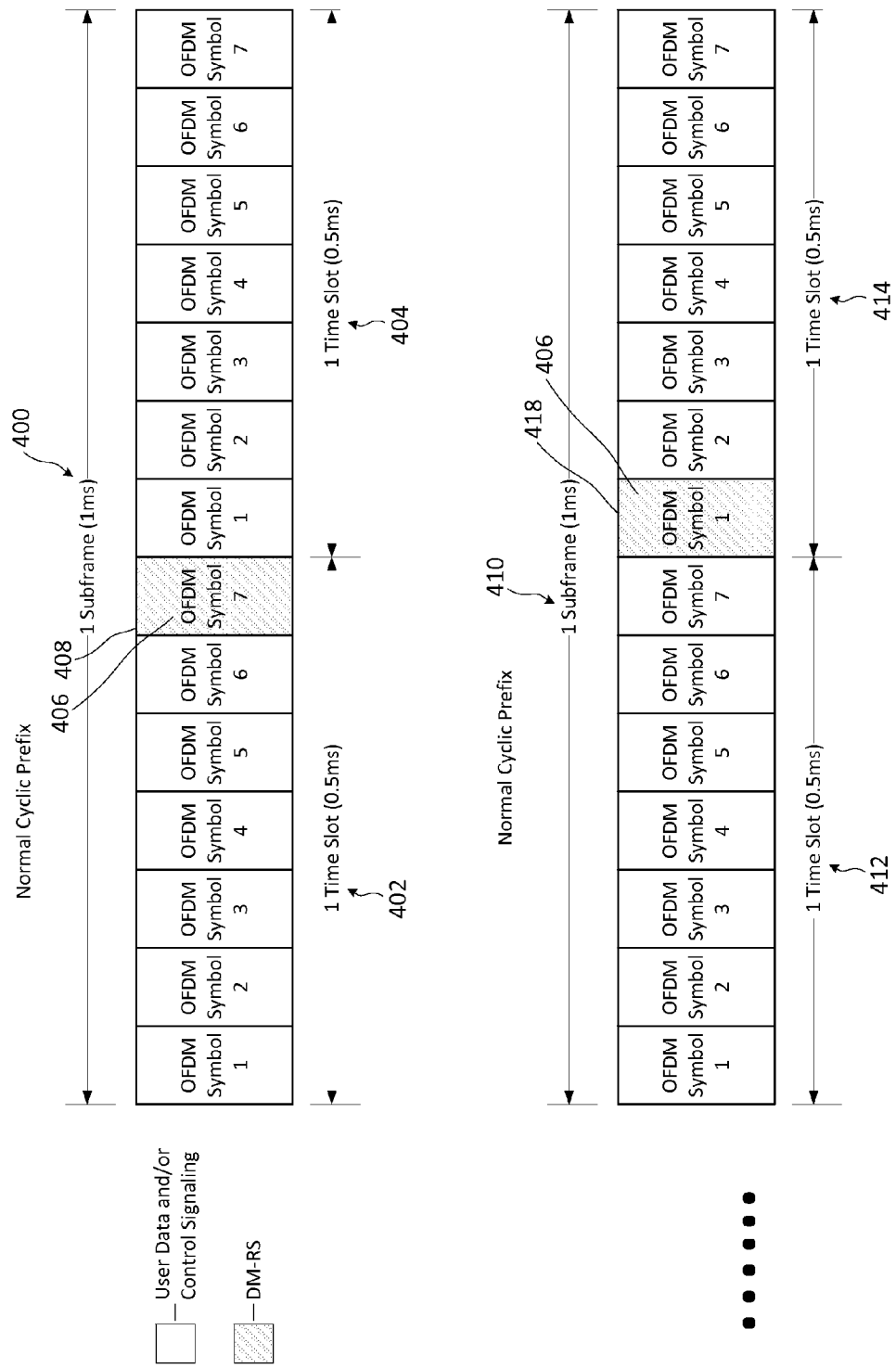
FIG. 4 is a diagram of an example mapping of DM-RS transmission that may be shifted towards the edge of a time slot of a subframe with a normal cyclic prefix.

FIG. 4 is a diagram of an example mapping of DM-RS transmission that may be shifted towards the edge of a time slot of a subframe with a normal cyclic prefix. As shown in FIG. 4, a subframe 400 may include two time slots, a first time slot 402 and a second time slot 404, and a subframe 410 may include two time slots, a first time slot 412 and a second time slot 414. The subframe 410 may be a subsequent subframe (e.g., a consecutive subframe) of the subframe 400. A DM-RS transmission 406 may be included in the last OFDM symbol, such as the seventh OFDM symbol 408 for normal cyclic prefix, of the first time slot 402 of the subframe 400, and the DM-RS transmission 406 may be included in the first OFDM symbol 418 of the second time slot 414 of the subframe 410. The DM-RS transmission 406 may be absent from the second time slot 404 of the subframe 400 and absent from the first time slot 412 of the subframe 410. For example, the OFDM symbols that do not include DM-RS transmission may include user data and/or control signaling as opposed to a DM-RS.

In an example, the groups may be such that certain subframes are not included in either group and therefore certain subframes may occur without any DM-RS transmission. If one or more subframes do not include a DM-RS, the network may be configured to utilize DM-RS subframe bundling for channel estimation for those subframes. As a result, a DM-RS from another subframe may be used to estimate the channel for a subframe that does not include a DM-RS transmission. Thus, a single DM-RS may be applicable to multiple subframes.

Figure 5:
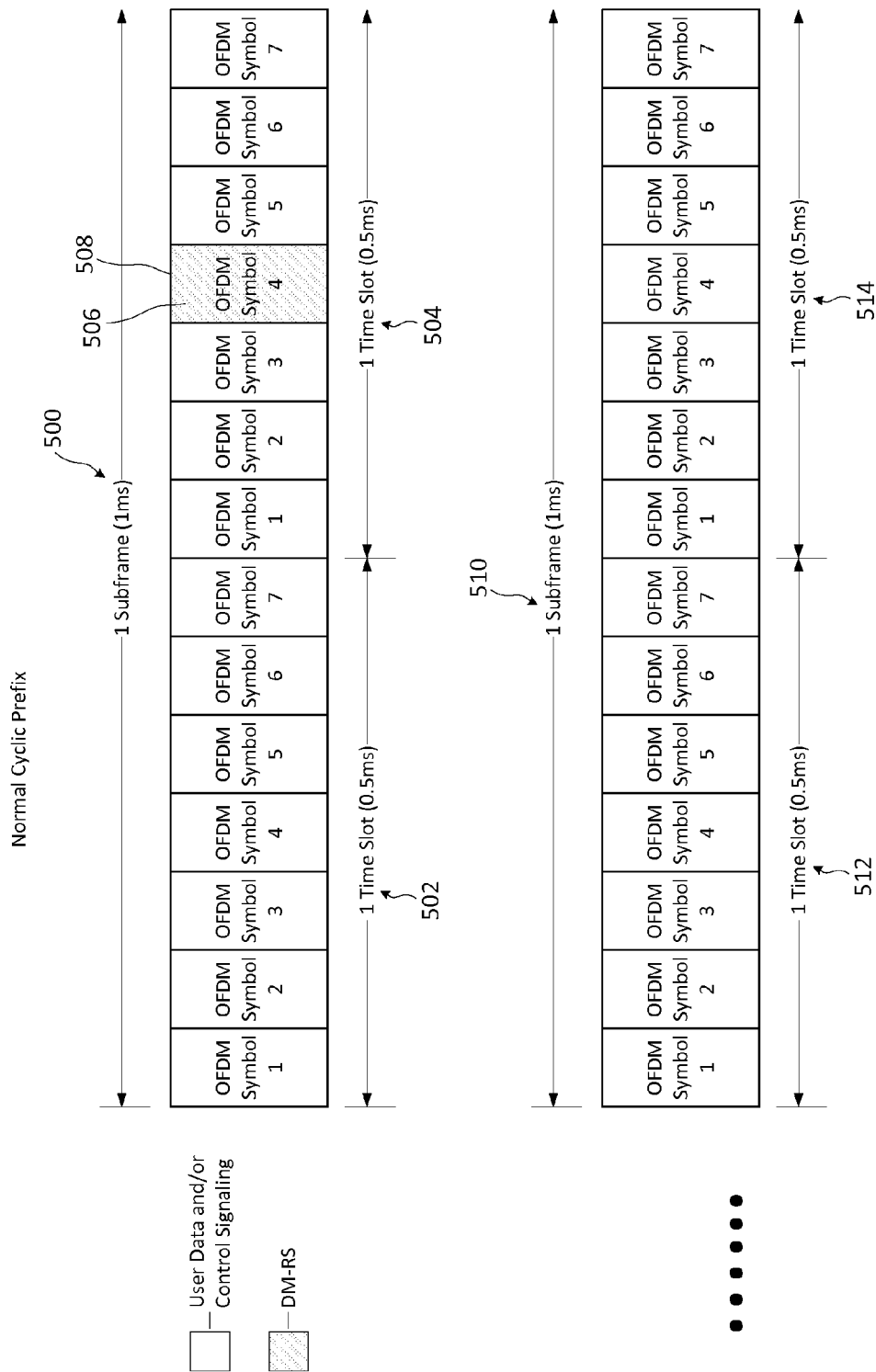
FIG. 5 is a diagram of an example mapping of DM-RS transmission in two subframes using subframe bundling with a normal cyclic prefix.

FIG. 5 is a diagram of an example mapping of DM-RS transmission in two subframes using subframe bundling with a normal cyclic prefix. As shown in FIG. 5, a subframe 500 may include two time slots, a first time slot 502 and a second time slot 504, and a subframe 510 may include two time slots, a first time slot 512 and a second time slot 514. The subframe 510 may be a subsequent subframe (e.g., a consecutive subframe) of the subframe 500. A DM-RS transmission 506 may be included in an OFDM symbol, such as the fourth OFDM symbol 508, of the first time slot 502 of the subframe 500. The subframe 510 may not include a DM-RS of the DM-RS transmission 506. As such, the DM-RS transmission 506 of the subframe 500 may be used to estimate the channel for the subframe 510. Thus, a single DM-RS (e.g., the DM-RS included in the fourth OFDM symbol 508 of the subframe 500) may be applicable to multiple subframes (e.g., the subframe 510). Although illustrated as being included in the fourth OFDM symbol 508 of the second time slot 504 of the subframe 500, the DM-RS transmission 506 may be included in any OFDM symbol of either time slot 502, 504 of the subframe 500. Although illustrated as being used for a subsequent subframe, the DM-RS transmission 506 may be used to estimate the channel for a subframe that precedes the subframe 510.

In an example, a WTRU may be configured to utilize interlaced frequency division multiplexing (FDM) for DM-RS transmission. For example, a DM-RS transmission may be transmitted over a subset of subcarriers on an appropriate OFDM symbol (e.g., the fourth OFDM symbol for normal cyclic prefix, the third OFDM symbol for extended cyclic prefix, any other OFDM symbol used for enhanced DM-RS, etc.). The subcarriers that are not part of the subset may be used for data user data transmission and/or other control channel transmission (e.g., via the PUSCH and/or the PUCCH).

For example, a DM-RS may be interlaced with the PUSCH, PUCCH, and/or any other UL channel. For example, half the subcarriers in a given OFDM symbol may be used for DM-RS transmission, while the other half may be used for PUSCH. As an example, even numbered subcarriers in an OFDM symbol may be used for DM-RS transmission (e.g., DM-RS data is mapped to the REs that correspond to the even numbered subcarriers of the OFDM symbol) while odd numbered subcarriers may be used for PUSCH and/or PUCCH (e.g., PUSCH data is mapped to the REs that correspond to the odd numbered subcarriers with the OFDM symbol), or vice-versa.

In an example, half of the subcarriers typically utilized for DM-RS transmission in a given OFDM symbol (e.g., according to Release 8/10) may be used for DM-RS transmission, while the other half of the REs may be used for other types of data transmission, for example, to reduce DM-RS overhead. In an example, greater or less than half of the subcarriers typically utilized for DM-RS transmission in a given OFDM symbol (e.g., according to Release 8/10) may be used for DM-RS transmission. For example, the total number of subcarriers used for a given DM-RS transmission may be an integer that is less than the total number of subcarriers assigned to the WTRU. In an example, the total number of subcarriers used for DM-RS transmission may remain a multiple of 12, thus enabling the reuse of Zadoff Chu (ZC) sequences designed for legacy DM-RS. Similarly, for the case where some PRBs include DM-RS transmissions and others do not, the number of PRBs that include a DM-RS transmission may be different than the number of PRBs that do not include a DM-RS transmission.

Figure 6:
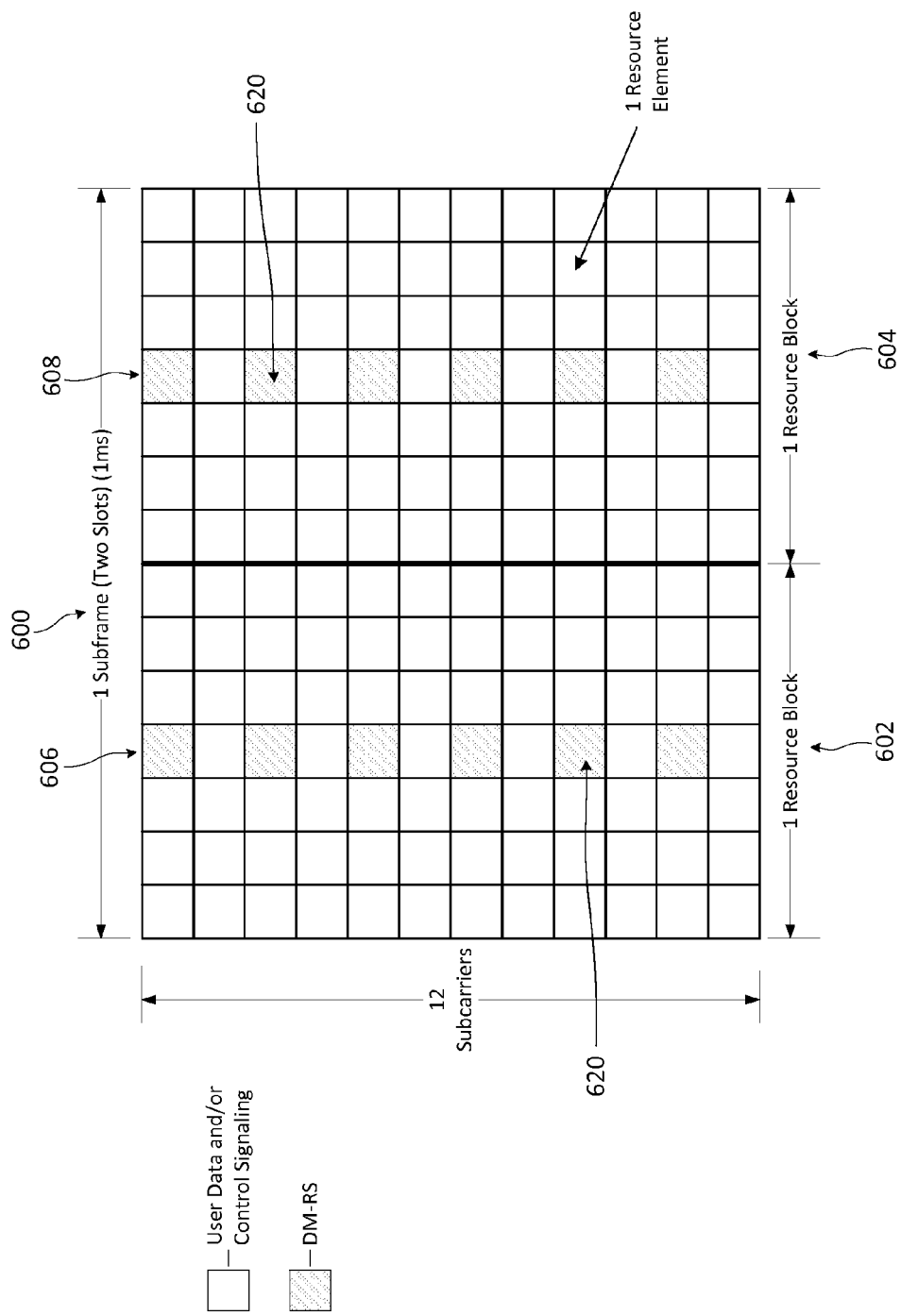
FIG. 6 is a diagram of an example mapping of DM-RS transmission in a subset of subcarriers of orthogonal frequency-division multiplexing (OFDM) symbols of two time slots of a subframe.

FIG. 6 is a diagram of an example mapping of DM-RS transmission in a subset of subcarriers of orthogonal frequency-division multiplexing (OFDM) symbols of two time slots of a subframe. As shown in FIG. 6, a subframe 600 may include two time slots, a first time slot 602 and a second time slot 604 (e.g., which may be represented by a PRB, but are not limited to such a size). An OFDM symbol in the time slots 602, 604 may include a DM-RS transmission 620, but the DM-RS transmission 620 may be included in a subset of the subcarriers of the OFDM symbols. For example, a subset of the subcarriers of a fourth OFDM symbol 606 of the first time slot 602 of the subframe 600 may include the DM-RS transmission 620, while the remaining subcarriers of the fourth OFDM symbol 606 may include user data and/or control signaling. Stated another way, one or more REs of a PRB of the fourth OFDM symbol 606 may include DM-RSs while the remaining REs of the PRB may include user data and/or control signaling. Similarly, a subset of the subcarriers of a fourth OFDM symbol 608 of the second time slot 604 of the subframe 600 may include the DM-RS transmission 620, while the remaining subcarriers of the fourth OFDM symbol 606 may include user data and/or control signaling. For example, odd numbered sub-carriers of the OFDM symbol 606 and the OFDM symbol 608 may include the DM-RS transmission 620, while even numbered sub-carriers of the OFDM symbol 606 and the OFDM symbol 608 may include user data and/or control signaling.

Although illustrated as being included in the fourth OFDM symbols 606, 608 of the subframe 600, the DM-RS transmission 620 may be included in any OFDM symbol of either time slot 602, 604 of the subframe 600. Although illustrated as being included in the odd numbered subcarriers of the OFDM symbol 606 and the OFDM symbol 608, the DM-RS transmission 620 may be included in the even numbered sub-carriers of the OFDM symbol 606 and the OFDM symbol 608, while user data and/or control signaling may be included in the odd numbered sub-carriers of the OFDM symbol 606 and the OFDM symbol 608. The OFDM symbol of the first time slot 602 that includes the DM-RS transmission 620 may be different (e.g., a different position) than the OFDM symbol of the second time slot 604 that includes the DM-RS transmission 620. The number, order, and/or position of REs that include the DM-RS transmission 620 may vary between time slots of a subframe, between subframes of a data stream, and/or between PRBs associated with the DM-RS transmission 620.

Figure 7:
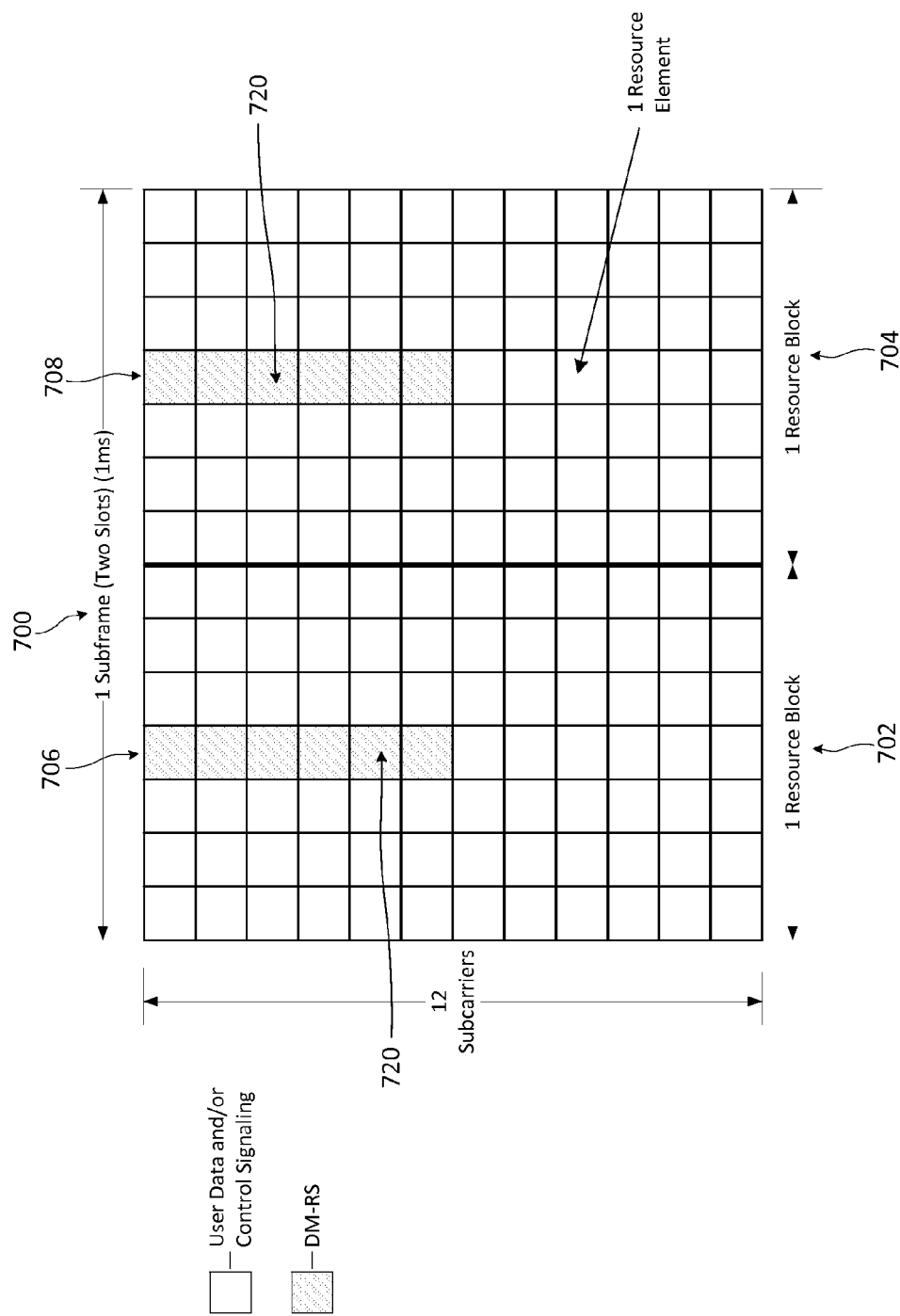
FIG. 7 is a diagram of an example mapping of DM-RS transmission in a subset of subcarriers of OFDM symbols of two time slots of a subframe.

In an example, the first six subcarriers of the appropriate OFDM symbol in a PRB may be used for DM-RS transmission, while the last six subcarriers may be used for transmission of user data and/or control signaling (e.g., via the PUSCH and/or the PUCCH), or vice-versa. FIG. 7 is a diagram of an example mapping of DM-RS transmission in a subset of subcarriers of OFDM symbols of two time slots of a subframe. As shown in FIG. 7, the first six subcarriers of an OFDM symbol, such as the fourth OFDM symbol 706, of a PRB of a first time slot 702 may be used for DM-RS transmission 720, while the last six subcarriers of the PRB may be used for transmission of user data and/or control signaling (e.g., via the PUSCH and/or the PUCCH). Similarly, the first six subcarriers of an OFDM symbol, such as the fourth OFDM symbol 708, of a PRB of a second time slot 704 may be used for DM-RS transmission 720, while the last six subcarriers of the PRB may be used for transmission of user data and/or control signaling (e.g., via the PUSCH and/or the PUCCH). Although illustrated as being included in the fourth OFDM symbols 706, 708 of the subframe 700, the DM-RS transmission 720 may be included in any OFDM symbol of either time slot 706, 708 of the subframe 700. In an example, the OFDM symbols may be different for the time slots 706, 708 of the subframe 700.

In an example, for certain time slots and/or subframes, the subcarriers in a PRB (e.g., all of the subcarriers in a PRB) may be used for PUSCH and/or PUCCH transmission (e.g., the WTRU may refrain from transmitting DM-RS in the PRB). If a given PRB does not include DM-RS transmission, then a WTRU may be assigned a plurality of PRBs, where the plurality of PRBs may be a combination of one or more PRBs that include a DM-RS transmission (e.g., in a subset of, or all, subcarriers) and one or more PRBs that do not include a DM-RS transmission. As such, a DM-RS transmission schedule may be characterized by one or more PRBs that do not include a DM-RS transmission and one or more PRBs that include the DM-RS transmission, whereby the PRBs that do include the DM-RS transmission may include the DM-RS transmission in one or more subcarriers of one or more OFDM symbols of the PRB.

If interlaced FDM is utilized, the peak-to-average-power (PAPR) of the DM-RS portion of an OFDM symbol may be low due to ZC sequence generation. Similarly, the PAPR of the PUSCH portion of the OFDM symbol may be low due to the use of discrete Fourier transform (DFT) precoding. However, if the DM-RS transmission and the PUSCH transmission are multiplexed, it may be that the combination of the two signals (e.g., of which each may be characterized by low PAPR) into a single symbol may result in a transmission that is no longer characterized by a low PAPR. In order to ensure the interlaced symbol retains low PAPR characteristics, a WTRU may be configured to power scale the PUSCH REs accordingly. In an example, a WTRU may use a scaling factor to assist in the demodulation of the scaled PUSCH in the interlaced OFDM symbol. For example, a WTRU may include a scaling value in its transmission to assist in the demodulation of the scaled PUSCH in the interlaced OFDM symbol. In an example, a WTRU may be configured with approved scaling values that it may use in the event of an interlaced symbol losing its low PAPR characteristics.

In an example, a combination of time and/or frequency multiplexing methods may be used to decrease the number of resources utilized for DM-RS transmission. For example, in some embodiments a single time slot per subframe may be used for DM-RS transmission. The identity of the time slot used for DM-RS transmission may depend on the PRB(s) associated with a given allocation. For example, a WTRU may be configured to utilize DM-RS transmission in the first timeslot of a subframe for a first subset of PRBs (e.g., odd numbered PRBs) and utilize DM-RS transmission in the second timeslot of a subframe for a second subset of PRBs (e.g., even numbered PRBs). In an example, the number of PRBs with that include a DM-RS transmission may be greater, fewer, or equal to in number the number of PRBs that do not utilize DM-RS transmission. In an example, a WTRU may be configured to utilize two (e.g., both) time slots of a subframe for DM-RS transmission for a first subset of PRBs, to utilize a single (e.g., possibly alternating) time slot in a second subset of PRBs, and/or to refrain from transmitting DM-RSs in either timeslot for a third subset of PRBs.

In an example, a WTRU may use interleaving of PUSCH and/or PUCCH transmissions and DM-RS transmission in both time slots and/or in each PRB. As a result, a given subcarrier may have no DM-RS symbol mapped to it during a slot or subframe, a single DM-RS symbol mapped to it during a slot or subframe, and/or two DM-RS symbols mapped to it during a slot or subframe. For example, for a given PRB, odd numbered subcarriers may include a DM-RS transmission in the appropriate symbol of the first time slot, while even numbered subcarriers may include a DM-RS transmission in the appropriate symbol of the second time slot, or vice versa.

If interlaced frequency division multiplexing is used to decrease the DM-RS transmission overhead, the sequence (e.g., pilot sequence) used for DM-RS transmission may be modified. For example, the value of the DM-RS sequence mapped to a given resource element in a DM-RS transmission schedule may be the same value that would otherwise be used in the legacy scheme in resource elements for which DM-RS is still transmitted. The same sequence and resource mapping as in the legacy scheme may be used, but with puncturing such that some resource elements may be replaced with PUSCH and/or PUCCH symbols according to a reduction scheme.

As another example, the DM-RS sequence may be calculated based on the actual number of symbols for resource elements available to the uplink (UL) DM-RS in a given time slot $M_{sc}^{RS}$, which may be smaller than the number of subcarriers in the PUSCH resource allocation $M_{sc}^{PUSCH}$. If the total number of subcarriers used to transmit DM-RS in one time slot is a multiple of 12, a WTRU may reuse the sequence generation method utilized for legacy DM-RS transmission. A WTRU may determine the appropriate sequence length based on the number of PRBs granted and/or the ratio of REs used for DM-RS transmission to total REs. For example, in case of an interlaced frequency division multiplexing scheme in which DM-RS symbols and PUSCH symbols are interspersed within the same time slot, the reference signal sequence may be calculated based on a formula, for example, except that $M_{sc}^{RS}=M_{sc}^{PUSCH}/2$ (e.g., in case the DM-RS is reduced by a factor of two). The DM-RS to RE mapping may be pre-configured and/or may be performed in an order similar to previous releases, although the WTRU may be configured to skip certain subcarriers if the skipped subcarriers are not to be used for DM-RS transmission. The mapping to resource elements may follow the same rules as a legacy scheme, e.g., by order of subcarrier first and time slot second, within the resource elements designated for DM-RS.

For cases where the number of subcarriers used to transmit DM-RSs in one symbol is not a multiple of 12, sequences (e.g., new sequences) may be determined that satisfy similar properties as ZC sequences.

For cases where a single OFDM symbol (e.g., and/or a single time slot) per subcarrier is used for DM-RS transmission, the identity of the symbol (and/or time slot) used for DM-RS transmission may change over time (e.g., as a function of slot number, subframe number, system frame number (SFN), etc.) and/or over frequency (e.g., as a function of subcarrier number, as a function of PRB, etc.). The size of the sequence $M_{sc}^{RS}$ may remain the same as $M_{sc}^{PUSCH}$. The mapping to resource elements may be modified, for example, such that it may be by order of time slot first and subcarrier second. For the example case where DM-RS transmissions are included in even numbered subcarriers of the appropriate symbol of the first time slot and DM-RS transmissions are included in odd numbered subcarriers in the appropriate symbol of the second time slot, the mapping of a single length 12*N ZC sequence (e.g., where N is the total number of PRBs) may be done sequentially over the subcarriers. Therefore, the first symbol of the ZC sequence may be located in the first subcarrier in the first time slot. The second symbol of the ZC sequence may be located in the second subcarrier in the second time slot. The third symbol of the ZC sequence may be located in the third subcarrier in the first time slot, and the fourth symbol of the ZC sequence may be located in the fourth subcarrier in the second time slot, and so on. Such a mapping approach may be applicable even when groups of adjacent subcarriers have DM-RS transmission(s) in the same time slot. For example, subcarriers 0,1,2 may have DM-RS data in the first time slot, while subcarriers 3,4,5 may have DM-RS data in the second time slot, etc.

In an example, a WTRU may be configured to and/or triggered by the network to utilize a certain type of DM-RS transmission schedule. For example, the WTRU may be triggered based on detecting and/or moving to a small cell and/or a macro cell. The WTRU may be configured to utilize a certain DM-RS transmission schedule based on explicit signaling received from the network (e.g., radio resource control (RRC) signaling). For example, the network may configure the WTRU to devote greater or fewer resource elements for a DM-RS transmission and/or change the identity of resource elements used for a DM-RS transmission. One or more of the following methods for triggering the WTRU to change its DM-RS transmission schedule may be used in any combination.

In an example, higher layer signaling (e.g., medium access control (MAC) and/or RRC signaling) may semi-statically indicate the DM-RS transmission schedule to be used by a WTRU. In an example, a message may use a single bit to indicate whether to use a legacy (e.g., Release 8, Release 10, etc.) DM-RS transmission schedule or a DM-RS transmission schedule characterized by reduced overhead (e.g., via a reduction in DM-RS). The DM-RS transmission schedule characterized by reduced overhead may be a schedule that reduces the number of REs used for DM-RS transmission(s). The parameters for the DM-RS transmission schedule characterized by reduced overhead may be tied or linked to the cell physical cell identifier (PCI). For example, small cells may be associated with PCIs linked to DM-RS schedules characterized by reduced overhead and macro cells may be associated with PCIs linked to legacy DM-RS transmission schedules.

Higher layer signaling may indicate a DM-RS transmission schedule (e.g., whether a reduced DM-transmission schedule is to be used, an indication of the identity of slots and/or subcarriers to use for DM-RS transmission, etc.). In an example, RRC may be utilized to provide a plurality of DM-RS transmission schedules, for example a normal DM-RS transmission schedule and a resource-saving DM-RS transmission schedule. Dynamic signaling (e.g., Layer 1 (L1) signaling such as grants received via the physical downlink control channel (PDCCH), PDCCH orders, and/or MAC control elements (CEs)) may be used to indicate the DM-RS transmission schedule to use, for example, per UL transmission.

If a DM-RS transmission schedule characterized by reduced overhead is to be indicated dynamically (e.g., by sending an indication of a pre-configured DM-RS parameter set to be used), the configuration may be performed in a variety of ways. For example, downlink control information (DCI) included in a UL grant (e.g., DCI Format 0, DCI Format 4, a new DCI Format, etc.) may include a bit(s) (e.g., a new bit(s)) to indicate the identity of the pre-configured set of parameters to be used. In an example, the configuration of a DM-RS transmission schedule characterized by reduced overhead may be implicitly linked or tied to a PCI and/or virtual cell identifier (VCID), and for example, may be implicitly indicated by a VCID configuration.

In an example, a DM-RS transmission schedule may be implicitly indicated by based on the properties or parameters associated with an uplink grant. For example, the WTRU may be configured to determine the appropriate DM-RS transmission schedule based on one or more of the allocation size, the Modulation Coding Scheme (MCS) level, the subframe number, the frame number, the transmission mode, whether the grant is associated with semi-persistent scheduling (SPS) or not, and/or the like. In an example, a DCI Format (e.g., a new DCI Format) may be designed to be used with a specific set of DM-RS transmission schedule(s). In an example, the appropriate DM-RS transmission schedule may be linked or tied to whether the UL grant was received in WTRU-specific search space or the common search space within the PDCCH. In an example, a DM-RS transmission schedule(s) may be tied or linked to certain component carriers. Therefore, a WTRU may be implicitly triggered to utilize a DM-RS transmission schedule based on the carrier indicator field (CIF) include in an UL grant.

A WTRU may be configured to transmit PUSCH and/or PUCCH (e.g., and/or some other UL channel and/or signal) and a DM-RS transmission on the same set of resource elements and/or symbols. For example, DM-RS transmissions and PUSCH transmissions may occupy the same resources in the time domain (e.g., REs within an OFDM symbol may include both DM-RS transmission data and PUSCH transmission data), in the frequency domain (e.g., REs within a subcarrier and/or PRB may include both DM-RS transmission data and PUSCH transmission data), and/or in both the time and frequency domains (e.g., REs may include both DM-RS transmission data and PUSCH transmission data, for example on different transmission layers, separated by different cover codes, etc.). If DM-RS transmissions and PUSCH transmissions are to occupy the same resources, a WTRU may allocate half its transmission power to DM-RS transmission and half to PUSCH transmission (e.g., or to transmission of other UL channel(s) and/or signal(s)).

To facilitate demodulation, a WTRU may be configured to utilize orthogonal cover codes (OCCs) to allow for the separation of the DM-RS transmission from the PUSCH transmission, for example if the transmissions are to occupy the same REs. For example, a WTRU may be configured to repeat the same data symbols (e.g., PUSCH transmission) in the two time symbols that are used for DM-RS. Use of appropriate OCC precoding for DM-RS symbols (e.g., [1 1]) and/or PUSCH symbols (e.g., [1 -1]) may allow for proper demodulation at the eNB. Such a coding technique may be used in conjunction with examples of DM-RS transmission schedules described herein.

In an example where PUSCH (e.g., and/or PUCCH) and DM-RS transmission collide (e.g., where a single symbol per subframe is used for DM-RS transmission, etc.), the PUSCH data to be mapped to REs that collide with the DM-RS transmission(s) may be duplicated on other REs colliding with DM-RS, for example in the same symbol. For example, PUSCH data that is to be mapped to REs used for DM-RS transmission may be transmitted on one or more additional REs (e.g., so at least two REs include a copy of the relevant PUSCH data) in order to increase the likelihood of successful reception. For example, if PUSCH data is duplicated across two REs when it is transmitted with a DM-RS transmission, the same DM-RS transmission may also be duplicated in those same RE pairs. If such an approach is utilized, the OCC may be applied over subcarriers rather than over symbols. For example, data of a DM-RS transmission may be mapped to symbol 4 of the first time slot and in subcarriers 0, 2, 4, 6, 8, 10. In such a case, the PUSCH in subcarriers 0, 2, and 4 may be duplicated in subcarriers 6, 8, and 10. Furthermore, the DM-RS data transmitted on subcarriers 0, 2, and 4 may be duplicated in subcarriers 6, 8, and 10. If an OCC of values [a b] is used for PUSCH transmission and an OCC of values [c d] is used for DM-RS transmission, the values of a, b, c, and/or d may be selected to facilitate the code multiplexing. For example, the PUSCH transmission in subcarriers 0, 2, and 4 may be multiplied by 'a', while the PUSCH transmission in subcarriers 6, 8, and 10 may be multiplied by 'b'. The DM-RS transmission in subcarriers 0, 2, and 4 may be multiplied by 'c', and the DM-RS transmission in subcarriers 6, 8, and 10 may be multiplied by 'd'.

In an example, a WTRU may be configured to interlace PUSCH transmissions (e.g., and/or PUCCH transmissions) with DM-RS transmissions using reserved tones. For example, if PUSCH or other data is interlaced with DM-RS transmissions over different subcarriers within one symbol, the PUSCH data may be produced as an output of a DFT to reduce PAPR, and the DM-RS transmission may be a ZC sequence to also reduce the PAPR. Interlacing the DM-RS transmission and the PUSCH transmission into one time symbol may affect the PAPR properties of the overall symbol. In an example, to decrease the largest peaks of the overall OFDM signal, tone reservation may be used. For example, in one OFDM symbol (e.g., the fourth symbol of the first time slot, for normal cyclic prefix) some subcarriers may be used for DM-RS transmission, other subcarriers may be used for PUSCH transmission, and other subcarriers may be used for reserved tones. The reserved tones may be modulated in such a way that the largest peaks of the overall OFDM signal may be suppressed, which may allow for reduced power-amplifier back-off.

As an example, a WTRU may be configured with a spacing of three subcarriers between DM-RS transmission REs, PUSCH transmission REs (e.g., and/or PUCCH transmission REs), and reserved tone REs. A different subcarrier shift may be applicable to one or more of the DM-RS transmission, the PUSCH transmission, and the reserved tone transmission, for example to ensure the transmissions do not collide. For example, the DM-RS transmission may be mapped to a first subset of subcarrier (e.g., subcarriers 0, 3, 6, 9) of the appropriate OFDM symbol, the PUSCH transmission may be mapped to a second subset of subcarriers (e.g., subcarriers 1, 4, 7, 10) of the same OFDM symbol, and the remaining subcarriers (e.g., 2, 5, 8, 11) may be reserved for tones configured to decrease the larger peaks of the OFDM signal.

In an example, one or more of the DM-RS transmission, the PUSCH transmission, and the transmission of the reserved tones may be configured to use some or all subcarriers of respective (e.g., possibly overlapping) sets of PRBs, for example, one or more of the subcarriers within one PRB. In an example, the total number of REs used for DM-RS transmission, the total number of REs used for PUSCH transmission, and/or the total number of REs used for reserved tone transmission may be OFDM symbol specific and/or PRB specific and/or the ratio of REs used for the different purposes may vary over time and/or frequency. For example, a WTRU may be configured with RE subsets to use for DM-RS transmission, PUSCH transmission, and/or reserved tone transmission. The subsets may be configured explicitly using a bitmap and/or a bitstream mapped to a table of possible RE subsets. In an example, a RE subset (e.g., for DM-RS transmission, PUSCH transmission, and/or reserved tone transmission) may be obtained from configuration parameters. Such configuration parameters may include the RE periodicity and/or a subcarrier shift.

In an example, a WTRU may be configured to precode one or more reference signals (e.g., DM-RSs) with user data (e.g., PUSCH data). SC-FDMA may be used to minimize the PAPR, for example, in UL transmissions for LTE. In an example, interlaced PUSCH and DM-RS symbols may be input to an SC-FDMA signal generator, for example, to decrease the overhead associated with DM-RS transmission while maintaining a relatively low PAPR. The bit stream that forms the input to the SC-FDMA signal generator may include alternating PUSCH and DM-RS modulation symbols. In an example, the bit stream that forms the input to the SC-FDMA signal generator may include the DM-RS modulation symbols to be transmitted (e.g., in an OFDM symbol, slot, subframe, etc.) followed by the PUSCH modulation symbols to be transmitted (e.g., or vice versa). The output of the DFT may be applied to the appropriate OFDM symbol (e.g., the fourth symbol of the first and/or second time slot for normal cyclic prefix). In such a case, the RS may be different that a ZC sequence. For example, a Gold sequence initialized based on the cell PCI and/or the VCID may be used.

In order to decrease the DM-RS overhead, a WTRU may be configured to perform UL transmission(s) without DM-RS transmission. To compensate for the lack of DM-RSs, a WTRU may be configured to transmit precoded sounding reference signals (SRSs) and/or non-precoded SRSs in the subframe where DM-RS-free PUSCH transmission occurs. Precoding of the SRSs may be omitted, for example, given that in LTE the uplink precoder matrix may be selected by the network and/or may be provided to the WTRU in an uplink scheduling grant.

To configure a WTRU for DM-RS-free transmission(s), the SRS request field may be used to indicate that the WTRU should perform DM-RS-free transmission. For example, a WTRU may be configured such that one of the SRS parameter sets configured by higher layers for the SRS request corresponds to DM-RS-free PUSCH transmission with SRS. For example, an SRS request field value of '11' may configure a WTRU to transmit aperiodic SRS with a DM-RS-free PUSCH. In an example, to configure a WTRU with DM-RS-free PUSCH, the network may use one of the reserved bit fields used for UL precoding information in DCI Format 4 and/or other DCI Formats. The bits corresponding to the UL precoding information fields may indicate a specific precoder matrix as well as the use of DM-RS-free PUSCH transmission. As an example, for the case of two antenna ports with one codeword, bit fields 6 and 7 may be used for one layer DM-RS-free transmission with Transmitted Precoding Matrix Indicator (TPMI)=0 and TPMI=1 (e.g., or any other higher layer configured and/or pre-configured TPMI values), respectively. For two antenna ports with two codewords, bit field 1 may be used to indicate two layer DM-RS-free transmission with TPMI=0. For four antenna ports with one codeword, bit fields 40-63 may be reused for one or two layer DM-RS-free transmission with a subset of available TPMI (e.g., either pre-configured or configured by higher layers). For four antenna ports with two codewords, bit fields 29-63 may be reused for two, three, and/or four layer DM-RS-free transmission with any of the available TPMI (e.g., either pre-configured and/or configured by higher layer signaling).

In an example, a WTRU may be able to transmit UL data using any of a number of DM-RS transmission schedules, which for example, may include a legacy DM-RS transmission schedule(s) and/or one or more reduced DM-RS transmission schedule(s). In one or more subframes, a WTRU may use a legacy DM-RS transmission schedule, while in another subset of subframes the WTRU may transmit DM-RS in a single time slot of a subframe. The WTRU may be semi-statically configured with subsets of subframes, e.g., via RRC signaling, where for one or more of the subset of subframes, the WTRU may use a different DM-RS transmission schedule. For example, two or more DM-RS transmission schedules may be defined, where in a first DM-RS transmission schedule the DM-RS is transmitted in a first slot and in a second DM-RS transmission schedule the DM-RS is transmitted in a second slot. The WTRU may transmit the first DM-RS transmission schedule in even subframes and the second DM-RS transmission schedule in odd subframes, for example, to enhance the quality of channel estimation when two UL transmissions occur in consecutive subframes. In an example, the WTRU may be configured via higher level signaling with one or more of DM-RS transmission schedules, for example, with an index (e.g., each with an index). The WTRU may be configured (e.g., dynamically) with the appropriate DM-RS transmission schedule for a subframe (e.g., each subframe) by adding a corresponding index in the UL grant DCI. In an example, a WTRU may be configured with a legacy DM-RS transmission schedule(s) as well as a DM-RS transmission schedule(s) characterized by reduced overhead. One or more bits may be included in a UL grant and may be used to trigger a DM-RS transmission schedule(s). The absence of the bit and/or a predetermined value of the bit (e.g., 0 or 1) may cause a WTRU to use a legacy DM-RS transmission schedule.

There may be rules for switching DM-RS transmission schedules. The WTRU may be configured to switch (e.g., dynamically switch) between different DM-RS transmission schedules. For example, subframes where HARQ-ACK, RI, and/or CQI/PMI are transmitted in the PUSCH may use a first DM-RS transmission schedule. Whereas subframes where data (e.g., only data) is transmitted may use a second DM-RS transmission schedule. The DM-RS transmission schedule may be determined (e.g., implicitly) based on the number of transmission layers. The DM-RS transmission schedule may be determined (e.g., implicitly) based on the OCC used on the DM-RS. The DM-RS transmission schedule may be determined (e.g., implicitly) based on the virtual cell ID used for DM-RS. The DM-RS transmission schedule may be determined (e.g., implicitly) based on the sequence and/or cyclic shift used for DM-RS.

The DM-RS transmission schedule to be used may be a function of the frame, subframe, and/or time slot number. A WTRU may be configured with sets of subframes for a (e.g., each) DM-RS transmission schedule, for example, for semi-persistent scheduling. The WTRU may determine the DM-RS transmission schedule based on a previously used DM-RS transmission schedule. For example, if a first subframe uses a first DM-RS transmission schedule, the next scheduled subframe may switch to a different DM-RS transmission schedule, for example, in a pre-configured order. The WTRU may be configured to switch DM-RS transmission schedules for each retransmission, for example, in a pre-configured order.

The DCI may be used to determine the DM-RS transmission schedule to be used in the scheduled grant. The DCI Format used may configure the WTRU for a DM-RS transmission schedule. Values of the precoding information field in the DCI may indicate to the WTRU what DM-RS transmission schedule to use. A WTRU may be configured to use different DM-RS transmission schedule based on the number of layers. Upon decoding an uplink grant for a specific number of layers, the WTRU may determine the appropriate DM-RS transmission schedule.

In an example, a transport block size may be indicated. In a subframe in which the WTRU uses a DM-RS transmission schedule characterized by reduced overhead, the transport block size determination may be different from a case in which a WTRU uses a legacy DM-RS transmission schedule. The modulation and coding scheme (MCS) indication included in the UL grant may have a different mapping to Transport Block Sizes (TBS). A WTRU may be configured with a MCS to TBS mapping table (e.g., a new MCS to TBS mapping table) for DM-RS subframes. The table may take into account the reduction in DM-RS overhead. A WTRU may use the DM-RS transmission schedule, which may have been obtained semi-statically or dynamically, to determine the appropriate MCS-to-TBS mapping table to use.

In another example, the MCS index included in the UL grant may implicitly indicate the TBS table that may be used. The WTRU may determine the type of DM-RS transmission schedule that may be used based on the MCS index. A subset of MCS indices may be associated with a DM-RS subframe type. The WTRU may be configured via higher layers, the mapping between values of MCS, and/or the type of DM-RS. For example, a WTRU may be configured with a list of MCS indices. Such MCS indices may map to a DM-RS transmission schedule(s) (e.g., a DM-RS transmission schedule characterized by reduced overhead), and other MCS indices may map to DM-RS transmission schedule(s) (e.g., legacy DM-RS transmission schedule(s)).

An MCS-to-TBS table that may be used for DM-RS transmission schedule(s) may be defined explicitly and preconfigured in the WTRU. In an example, the TBS value may be determined as a function of the legacy MCS-to-TBS table. For example, if the DM-RS transmission schedule(s) characterized by reduced overhead are obtained by transmitting DM-RS in one time slot, the overhead reduction may be 12 REs per PRB (e.g., a reduction of 1/14). Upon receiving an MCS index, the WTRU may determine the TBS by examining the table configured for a legacy DM-RS transmission schedule and multiplying the TBS value by a preconfigured value, e.g., 156/144≈1.0833 and using a floor function, e.g., $TBS_{enhanced} = \lfloor 1.0833 TBS \rfloor$, where TBS may be obtained from the MCS value. In an example, given that the savings in overhead from DM-RS located in a single time slot are equivalent to a gain of an extra PRB every 14 PRBs, the conversion may be performed taking those savings into account. For example, every 14 PRBs assigned may map to a TBS for 15 PRBs. An adjustment may be added for assignments that are not multiples of 14. The TBS may be determined from the MCS and the number of PRBs allocated such that, for example, $$TBS_{enhanced} = f\left(I_{MCS}, N_{PRB} + \left\lfloor \frac{N_{PRB}}{14} \right\rfloor\right) + \Delta \bmod(N_{PRB}, 14),$$

where the function $f$ may be the appropriate location on the preconfigured mapping table and delta is a preconfigured value.

In an example, DM-RS transmission schedule(s) may be configured for retransmission of PUSCH. The WTRU may support the use of multiple DM-RS transmission schedules. The type of DM-RS transmission schedule may change often. This change may occur after a WTRU has made a transmission, but before the WTRU makes a retransmission. Accordingly, the type of DM-RS transmission schedule a WTRU is expected to use in this situation may be ambiguous. In an example, when a WTRU is indicated via a NACK on PHICH that the WTRU should retransmit the transport block, it may be assumed that the WTRU reuses the same DM-RS transmission schedule that was used in the previous transmission, overriding a DM-RS transmission schedule for that subframe.

In another example, a WTRU may be provided an UL grant on a PDCCH that requested a retransmission, e.g., by an appropriate toggle of a data indicator. The WTRU may be indicated via the MCS index the redundancy version that it is expected to transmit. The MCS indices mapping to different redundancy versions may be separated into different groups. One or more of the group(s) (e.g., each group) may map to a different DM-RS transmission schedule. The WTRU may be able to infer or determine the appropriate MCS/TBS to use in the retransmission, for example, from this mapping, as well as the appropriate redundancy version.

In an example, the WTRU may use a combination of the configured DM-RS transmission schedule for the retransmission subframe and the signaled redundancy version to determine the appropriate MCS/TBS to use for the retransmission. One or more of the MCS indices (e.g., each MCS index) that is mapped to redundancy versions may have multiple meanings, depending on the configured DM-RS transmission schedule for the retransmission subframe.

In an example, for an UL grant indicating retransmission, the WTRU may be provided with a MCS index (e.g., a new MCS index) that is not mapped to a redundancy version. The presence of this MCS index may implicitly indicate to the WTRU that a DM-RS transmission schedule (e.g., a DM-RS transmission schedule characterized by reduced overhead) may be used in the retransmission subframe. It may indicate to the WTRU the MCS/TBS to use, for example, using the appropriate TBS mapping rule based on the DM-RS transmission schedule. To allow for different redundancy versions, the WTRU may be preconfigured with an order of redundancy and versions to be used when the DM-RS transmission schedule changes and the MCS is not used for redundancy version indication.

In an example, in an UL grant for retransmission, a bit flag may be included that may indicate the type of DM-RS transmission schedule that may be used. This indication (e.g., in combination with the MCS index, which may trigger a redundancy version) may allow the WTRU to determine the redundancy version as well as the appropriate MCS/TBS.

One or more embodiments contemplate DM-RS sequence generation. Embodiments recognize that the sequence-group number that may be used for DM-RS sequence generation (e.g., the determination of a DM-RS transmission schedule(s)) may no longer be a function of the time slot, perhaps given that there may be a single DM-RS per subframe, among other reasons. In some embodiments, the sequence-group number u may be defined as $u=(f_{gh}(n)+f_{ss})$ mod 30, where $n=i-1$ for the $i^{th}$ DM-RS transmission in the radio frame, for example, for reduced DM-RS transmission schedule(s) among other reasons. For example, a WTRU may be configured with a radio frame where one or more, or each, subframe may have a single DM-RS located in the first time slot, the n could be defined as n=SFN mod 10, where SFN is the subframe number. The value of n may be reused, for example, to replace the slot number in a legacy formulation of sequence hopping and/or cyclic shift hopping, among other reasons.

The sequence-group hopping, sequence hopping, and/or cyclic shift hopping may be performed over subframes and/or the hopping values may remain constant over pairs of time slots, for example, for a DM-RS transmission schedule where a sequence (e.g., a single sequence) may be spread over multiple symbols (e.g., the hybrid method where a single DM-RS is partially in a first time slot and partially in the second time slot), among other scenarios.

The WTRU may be indicated (e.g., explicitly indicated) what value of n may be used in the UL grant. Sequence-group hopping, sequence hopping, and/or cyclic-shift hopping may be re-initiated, for example, upon switching from one DM-RS transmission schedule to another, among other scenarios.

Data and/or control information may be multiplexed. A number of coded modulation symbols per layer for HARQ-ACK, RI, PMI/CQI, and/or UL-SCH data may be used. In some subframes, data may be multiplexed with CQI, PMI, RI and/or ACK. In such scenarios, the mapping of one or more, or each, component of the transport block may be done according to one or more of the rules described herein, for example, in order to properly take account of a reduced DM-RS transmission schedule(s), among other reasons. For example, when the WTRU transmits HARQ-ACK bits, and/or rank indicator bits, and/or CQI/PMI bits, among other scenarios, it may determine the number of coded modulation symbols per layer Q' for HARQ-ACK, and/or rank indicator, and/or CQI/PMI as a function of $N_{symb}^{PUSCH\text{-}initial}$, $M_{sc}^{PUSCH}$ and/or $M_{sc}^{PUSCH\text{-}initial}$, where $N_{symb}^{PUSCH\text{-}initial}=(2(N_{symb}^{UL}-1)-N_{SRS})$. $N_{symb}^{UL}$ is the number of SC-FDMA symbols per subframe. $N_{SRS}$ is either 0 or 1, perhaps depending on if there is an SRS transmission in the subframe, among other reasons. $M_{sc}^{PUSCH}$ is the scheduled bandwidth for PUSCH transmission in the current subframe. $M_{sc}^{PUSCH\text{-}initial}$ is the initial scheduled bandwidth obtained from the initial (E)PDCCH.

In some embodiments, perhaps if the WTRU is scheduled with a reduced DM-RS transmission schedule, and perhaps where there may be a single DM-RS symbol per subframe, among other scenarios, the WTRU may be configured to use $N_{symb}^{PUSCH\text{-}initial}=(2(N_{symb}^{UL}-1)-N_{SRS}+1)$. In some embodiments, perhaps for a legacy DM-RS transmission schedule, among other scenarios, the product of $N_{symb}^{PUSCH\text{-}initial}$, $M_{sc}^{PUSCH\text{-}initial}$ may be used in a function to determine Q' and/or G, the total number of coded bits for UL-SCH data information. In some embodiments, perhaps for a reduced DM-RS transmission schedule, among other scenarios, the product $N_{symb}^{PUSCH\text{-}initial} \cdot M_{sc}^{PUSCH\text{-}initial}$ in the function for Q' and G, may be replaced by $(N_{symb}^{UL}-$ $N_{SRS}$)·$M_{sc}^{PUSCH\text{-}initial}$−$N_{ULDM\text{-}RS}$, where $N_{ULDM\text{-}RS}$ is the total number of REs that may be used for a DM-RS transmission schedule in the scheduled bandwidth.

In some embodiments, perhaps for a reduced DM-RS transmission schedule, among other scenarios, there may be a set of values of PUSCH transmission offsets (e.g., new values and/or heretofore undefined), $\beta_{offset}^{HARQ\text{-}ACK}$, $\beta_{offset}^{RI}$ and/or $\beta_{offset}^{CQI}$, possibly configured via higher layers, for example. The relationship between the higher layer signaled indices and the offsets may depend on whether the transmission in that subframe is for a DM-RS transmission schedule, among other factors.

Embodiments contemplate a channel interleaver of UL-SCH data, ACK-NACK, RI, and/or CQI/PMI. A channel interleaver may implement a time-first mapping of modulation symbols onto the transmit waveform. The interleaver may be done by filling a matrix with $N_{symb}^{PUSCH}$ columns and/or the number of rows that may be used to transmit at least some, or all, the data concatenated with CQI/PMI. In some embodiments, perhaps when configured with a reduced DM-RS transmission schedule, among other scenarios, the number of columns of the matrix may be determined by using $N_{symb}^{PUSCH}=(2(N_{symb}^{UL}-1)-N_{SRS}+1)$. In some embodiments, the WTRU may use $N_{symb}^{PUSCH}=(2N_{symb}^{UL}-N_{SRS})$ and may ensure that when data, HARQ-ACK, RI, and/or CQI/PMI information is written into the matrix, among other scenarios, the WTRU may skip one or more matrix entries that may be occupied by blank values. These blank values may be used to insert a reduced DM-RS.

There may be column sets for the insertion of HARQ-ACK and/or RI symbols. These column sets may ensure that HARQ-ACK and/or RI may be as close as possible to DM-RS. The column sets may be modified for the use of a reduced DM-RS transmission schedule. In some embodiments, perhaps for a single DM-RS per subframe, and perhaps located in a single time slot, among other scenarios, the HARQ-ACK and/or RI may be located (e.g., solely located) in the slot with DM-RS. In some embodiments, the symbol(s) for HARQ-ACK may be the one or two symbols (or more) closest to the DM-RS symbol and the symbol(s) for the RI may be the next one or two symbols (or more) closest to the DM-RS. For example, for DM-RS in symbol x of a subframe, the HARQ-ACK may be transmitted in symbols x−1 and x+1 and the RI may be transmitted in symbols x−2 and x+2. In some embodiments, the WTRU may be configured to use one or more symbols for the HARQ-ACK and/or RI. In some embodiments, perhaps for an DM-RS in symbol x of a subframe, among other scenarios, the HARQ-ACK may be located in symbols x−2, x−1, x+1, x+2 and/or the RI may be located in symbols x−4, x−3, x+3, x+4. In some embodiments, the HARQ-ACK may be located in symbols x−3, x−1, x+1, x+3 and/or the RI may be located in symbols x−4, x−2, x+2, x+4. In some embodiments, perhaps given that the DM-RS may be located near the beginning or end of a subframe, among other factors, there may not be enough symbols on one or more, or both, sides to accommodate using multiple symbols for HARQ-ACK and/or RI. In some embodiments, the symmetry constraint may be removed. For example, for an DM-RS in symbol 3, the HARQ-ACK may be located in symbols 2, 4 and 5 and/or the RI may be located in symbols 1, 6 and 7. As another example, the HARQ-ACK may be located in symbols 2, 4 and 6 and/or the RI may be located in symbols 1, 5 and 7.

Embodiments contemplate modified Orthogonal Cover Code (OCC) for a DM-RS transmission schedule. The use of orthogonal cover codes on the DM-RS may enable an increase in number of layers that can be supported and/or the ability to perform MU-MIMO. One or more embodiments contemplate that it may be useful to modify OCC behavior where a reduced DM-RS may be used, among other scenarios, for example. A DM-RS transmission schedule may be used to use one or more orthogonal cover codes (OCC) on a DM-RS, for example, to enable MU-MIMO. A DM-RS transmission schedule may be used to provide uplink control information (UCI) on the PUSCH, for example, with reduced DM-RS.

A DM-RS transmission schedule may be repeated over one or more pairs of subcarriers. A DM-RS transmission schedule may be repeated over x subcarriers. This repetition can be over multiple SC-FDMA symbols. For example, in a solution where DM-RS is transmitted in a single SC-FDMA symbol, the first x subcarriers may transmit a first symbol of the sequence, the second x subcarriers may transmit a second symbol of the sequence, and so on. This may be repeated for one or more, or each, transmission layer, whereby one, or more, or each, layer may be multiplexed on the same REs. In an example where the DM-RS may be in a first SC-FDMA symbol for one set of subcarriers and may be in a second SC-FDMA symbol for another (e.g., possibly disjoint) set of subcarriers, the sequence may be repeated such that one or more, or every, symbol in the sequence may occur once or more in the first SC-FDMA symbol and/or once or more in the second SC-FDMA symbol, on another subcarrier. For example, the DM-RS may be located in even subcarriers of SC-FDMA symbol 3 and in odd subcarriers of SC-FDMA symbol 10. The first layer's DM-RS sequence may be denoted by [a b c d e . . . ]. In such scenarios, the symbol 'a' may be placed in subcarrier 0 of SC-FDMA symbol 3 and/or subcarrier 1 of SC-FDMA symbol 10. Symbol 'b' may be placed in subcarrier 2 of SC-FDMA symbol 3 and/or subcarrier 3 of SC-FDMA symbol 10, and so on. This may be repeated for one or more other DM-RS layers, whereby one or more, or each, layer may be multiplexed on the same REs.

In some embodiments, perhaps in order to allow for the proper demodulation of one or more, or each transmission layer, among other reasons, OCC may be used in conjunction with cyclic shifts of the DM-RS transmission schedule. In some embodiments, perhaps where the DM-RS may be repeated in multiple subcarriers (e.g., whether on the same SC-FDMA symbol or not), among other scenarios, a different OCC vector per layer can be applied over multiple subcarriers. For example, a first OCC vector 'y' can be applied on one layer of DM-RS sequence symbols and another OCC vector 'z' can be applied on another layer.

In some embodiments, perhaps where DM-RS may be transmitted on a single SC-FDMA symbol and/or the DM-RS sequence symbols may be repeated over x subcarriers, among other scenarios, one or more, or each, OCC vector may also be of length x and/or the OCC can be applied as described herein. For example, for a first layer, one or more, or each, set of x subcarriers carrying the first sequence of DM-RS may be multiplied by 'y'. For a second layer, one or more, or each, set of x subcarriers carrying the second sequence of DM-RS may be multiplied by 'z'.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented in a wireless transmit receive unit (WTRU), the method comprising:
receiving a configuration indicating whether a first schedule or a second schedule should be used for transmitting a demodulation reference signal (DM-RS) associated with an uplink transmission, wherein the uplink transmission comprises a plurality of orthogonal frequency-division multiplexing (OFDM) symbols, wherein the first schedule corresponds to transmitting DM-RS in a single OFDM symbol of the uplink transmission, and wherein the second schedule corresponds to transmitting DM-RS in multiple OFDM symbols of the uplink transmission; and
transmitting DM-RS according to the configuration, wherein, according to the first schedule, the DM-RS is transmitted using a subset of subcarriers in the single OFDM symbol of the uplink transmission, and wherein, according to the second schedule, the DM-RS is transmitted using a subset of subcarriers in each of the multiple OFDM symbols of the uplink transmission.

2. The method of claim 1, wherein the configuration further indicates that, according to the first schedule, a Physical Uplink Shared Channel (PUSCH) transmission should be transmitted in the single OFDM symbol of the uplink transmission, and that, according to the second schedule, a PUSCH transmission should be transmitted in each of the multiple OFDM symbols of the uplink transmission, and wherein the method further comprises transmitting the PUSCH transmission according to the configuration.

3. The method of claim 1, wherein the configuration indicates that a first OFDM symbol or a last OFDM symbol of the uplink transmission should be used to transmit DM RS according to the first schedule.

4. The method of claim 1, wherein the configuration indicates that multiple non-consecutive OFDM symbols of the uplink transmission should be used to transmit DM-RS according to the second schedule.

5. The method of claim 1, wherein the configuration further indicates that, in the single or multiple OFDM symbols of the uplink transmission, a first subset of subcarriers should be used to transmit DM-RS and a second subset of subcarriers should be used to transmit a Physical Uplink Shared Channel (PUSCH) transmission.

6. The method of claim 1, further comprising determining whether to use the first schedule or the second schedule based on whether the WTRU is connected to a small cell or a macro cell.

7. A method implemented in a wireless transmit receive unit (WTRU), the method comprising:
receiving a configuration indicating a first demodulation reference signal (DM-RS) transmission schedule or a second DM-RS transmission schedule for the WTRU, wherein the first DM-RS transmission schedule is characterized by a DM-RS transmission being mapped to a first subset of subcarriers and a single orthogonal frequency-division multiplexing (OFDM) symbol of an uplink transmission, wherein the second DM-RS transmission schedule is characterized by a DM-RS transmission being mapped to the first subset of subcarriers and multiple OFDM symbols of the uplink transmission, and wherein the configuration further indicates that a Physical Uplink Shared Channel (PUSCH) transmission should be transmitted using a second subset of subcarriers in the one or multiple OFDM symbols of the uplink transmission; and
transmitting the DM-RS transmission and the PUSCH transmission according to the DM RS transmission schedule.

8. The method of claim 7, wherein the first subset of subcarriers and the second subset of subcarriers each include half of the total number of subcarriers available to the WTRU.

9. The method of claim 8, wherein one of the first subset of subcarriers or the second subset of subcarriers includes all even numbered subcarriers and the other of the first subset of subcarriers or the second subset of subcarriers includes all odd numbered subcarriers.

10. A wireless transmit receive unit (WTRU) comprising:
a processor configured to:
receive a configuration indicating whether a first schedule or a second schedule should be used for transmitting a demodulation reference signal (DM-RS) associated with an uplink transmission, wherein the uplink transmission comprises a plurality of orthogonal frequency-division multiplexing (OFDM) symbols, wherein the first schedule corresponds to transmitting DM-RS in a single OFDM symbol of the uplink transmission, and wherein the second schedule corresponds to transmitting DM-RS in multiple OFDM symbols of the uplink transmission; and
transmit DM-RS according to the configuration, wherein according to the first schedule, the DM-RS is transmitted using a subset of subcarriers in the single OFDM symbol of the uplink transmission, and wherein, according to the second schedule, the DM-RS is transmitted using a subset of subcarriers in each of the multiple OFDM symbols of the uplink transmission.

11. The method of claim 2, wherein the DM-RS and the PUSCH transmission are interlaced using a frequency division multiplexing scheme.

12. The method of claim 2, wherein the DM-RS and the PUSCH transmission are transmitted using orthogonal cover codes.

13. The WTRU of claim 10, wherein the configuration further indicates that, according to the first schedule, a Physical Uplink Shared Channel (PUSCH) transmission should be transmitted in the single OFDM symbol of the uplink transmission, and that, according to the second schedule, a PUSCH transmission should be transmitted in each of the multiple OFDM symbols of the uplink transmission, and wherein the processor is further configured to transmit the PUSCH transmission according to the configuration.

14. The WTRU of claim 10, wherein the configuration indicates that a first OFDM symbol or a last OFDM symbol of the uplink transmission should be used to transmit DM-RS according to the first schedule.

15. The WTRU of claim 10, wherein the configuration indicates that multiple non-consecutive OFDM symbols of the transmission should be used to transmit DM-RS according to the second schedule.

16. The WTRU of claim 10, wherein the configuration further indicates that, in the single or multiple OFDM symbols of the uplink transmission, a first subset of subcarriers should be used to transmit DM-RS and that a second subset of subcarriers should be used to transmit a Physical Uplink Shared Channel (PUSCH) transmission.

* * * * *

UNITED STATES PATENT AND TRADEMARK OFFICE
CERTIFICATE OF CORRECTION

PATENT NO. : 10,051,654 B2
APPLICATION NO. : 14/760407
DATED : August 14, 2018
INVENTOR(S) : J. Patrick Tooher, Paul Marinier and Marian Rudolf Page 1 of 1

It is certified that error appears in the above-identified patent and that said Letters Patent is hereby corrected as shown below:

In the Claims

Column 29, Line 46 Claim 3: Replace "DM RS" with "DM-RS"
Column 30, Line 14 Claim 7: Replace "DM RS" with "DM-RS"

Signed and Sealed this
Thirtieth Day of October, 2018

Andrei Iancu
*Director of the United States Patent and Trademark Office*